(12) United States Patent
Nandi et al.

(10) Patent No.: US 10,887,409 B2
(45) Date of Patent: *Jan. 5, 2021

(54) DETERMINING GEOLOCATION OF IP ADDRESSES USING USER TRANSITIONS OVER TIME

(71) Applicant: Microsoft Technology Licensing, LLC, Redmond, WA (US)

(72) Inventors: Arnab Nandi, Bangalore (IN); Ryan D. Clark, Woodinville, WA (US); Siddhartha Cingh Arora, Redmond, WA (US); Benjamin James Gaska, Tucson, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,871

(22) Filed: Apr. 17, 2019

(65) Prior Publication Data

US 2019/0245936 A1  Aug. 8, 2019

Related U.S. Application Data

(63) Continuation of application No. 15/336,225, filed on Oct. 27, 2016, now Pat. No. 10,298,704.

(51) Int. Cl.
| | | |
|---|---|---|
| *H04L 29/08* | (2006.01) |
| *G06F 16/29* | (2019.01) |
| *G06F 16/9537* | (2019.01) |
| *H04L 29/12* | (2006.01) |
| *H04L 29/06* | (2006.01) |

(52) U.S. Cl.
CPC .............. *H04L 67/22* (2013.01); *G06F 16/29* (2019.01); *G06F 16/9537* (2019.01); *H04L 61/2007* (2013.01); *H04L 67/18* (2013.01); *H04L 67/42* (2013.01)

(58) Field of Classification Search
CPC ..... H04L 67/18; H04L 67/22; G06F 17/3087; G06F 17/30241; G06F 16/29; H04W 64/00; H04W 64/003; H04W 4/29
See application file for complete search history.

(56) References Cited

U.S. PATENT DOCUMENTS

| | | | | |
|---|---|---|---|---|
| 8,874,713 B1* | 10/2014 | Herring | ................. | H04W 4/029 709/223 |
| 8,914,235 B1* | 12/2014 | Wichrowska | ........... | G01S 19/11 340/989 |
| 10,298,704 B2* | 5/2019 | Nandi | ................. | G06F 16/9537 |

(Continued)

*Primary Examiner* — John M Macilwinen

(57) ABSTRACT

The invention generally relates to systems and methods for determining geolocation for networks (e.g., IP addresses) for which accurate geolocation information in unknown. Various techniques are described for determining the physical location of networks by tracking user/device movement across different networks, and more particularly by tracking movement of particular users and/or devices from networks with known geolocation to networks with unknown geolocation. Aspects of the technology include using time and network address information (e.g., IP addresses) from user's queries and merging this information with known geolocation information to create new, high quality, geolocation mappings for previously unseen networks.

20 Claims, 15 Drawing Sheets

(56) References Cited

U.S. PATENT DOCUMENTS

2015/0127744 A1\* 5/2015 Moreels ............ G06Q 10/0833
709/204
2016/0179843 A1\* 6/2016 Heldt ...................... G06F 16/29
707/724

\* cited by examiner

Request Log 500

| Client ID 502 | IP Address 504 | Time Stamp 506 |
|---|---|---|
| 122 | B | 10.10.00 |
| 102 | A | 11.00.00 |
| 122 | E | 11.10.00 |
| 102 | A | 11.15.00 |
| 102 | E | 11.16.00 |
| 132 | F | 11.50.00 |
| 132 | E | 12.06.03 |
| 122 | B | 12.10.10 |
| 122 | B | 12.12.00 |
| 122 | E | 13.12.12 |
| 132 | D | 13.15.04 |
| 102 | C | 13.18.00 |
| 102 | E | 15.40.00 |
| 122 | D | 15.45.14 |

| Client ID 710 | IP Address 709 | Time Stamp 705 | |
|---|---|---|---|
| 102 | A | 11.00.00 | — 714 |
| 102 | A | 11.15.00 | — 716 |
| 102 | E | 11.16.00 | — 718 |
| 102 | C | 13.18.00 | — 720 |
| 102 | E | 15.40.00 | — 722 |
| 122 | B | 10.10.00 | |
| 122 | E | 11.10.00 | |
| 122 | B | 12.10.10 | — 724 |
| 122 | B | 12.12.00 | — 726 |
| 122 | E | 13.12.12 | |
| 122 | D | 15.45.14 | |
| 132 | F | 11.50.00 | — 728 |
| 132 | E | 12.06.03 | — 730 |
| 132 | D | 13.15.04 | |

700 — table; braces: 708 (rows 1–5), 710 (rows 6–11), 712 (rows 12–14)

FIG. 7

User Transition Log 800

| Client ID 810 | Known IP Address 812 | Unseen IP Address 814 | Time Elapsed 816 |
|---|---|---|---|
| 102 | A | E | 00.01.00 |
| 102 | C | E | 02.02.00 |
| 102 | C | E | 02.22.00 |
| 122 | B | E | 01.00.00 |
| 122 | B | E | 01.00.10 |
| 122 | B | E | 01.00.12 |
| 122 | D | E | 02.33.02 |
| 132 | D | E | 01.09.01 |

FIG. 8

DETERMINING GEOLOCATION OF IP ADDRESSES USING USER TRANSITIONS OVER TIME

CROSS-REFERENCE TO RELATED APPLICATIONS

This application is a continuation application and claims priority to U.S. patent application Ser. No. 15/336,225, filed Oct. 27, 2016, entitled "Determining Geolocation of IP Addresses Using User Transitions Over Time Using," now issued U.S. Pat. No. 10,298,704, which application is incorporated herein by reference in its entirety.

Physical location of Internet users is useful for many different kinds of applications. Search engines and other applications often use the location of a user to customize responses to user requests. For instance, when a user submits a query for "weather," search engines will use the user's location to display the weather forecast based on the location context of the user. Ecommerce websites may use geographic location information to pre-populate fields on forms, display different languages, and calculate shipping costs. Credit card companies use location information to detect fraud. Content delivery providers use location information to select the closest server to the user to deliver online content in a fast and cost-effective way. However, it is difficult to obtain accurate and complete information about the location of users.

For purposes of this application, a user's location is assumed to be the same as the location of the device the user is using. The location of the device may be inferred based on an IP address of the device. IP addresses are designed to allow one computer (or other digital device) to communicate with another computer (or other digital device) via a network, such as the Internet. IP addresses also allow the location of billions of digital devices that are connected to the Internet to be pinpointed and differentiated from other devices. In the same sense that a street address determines where a letter should be delivered, an IP address identifies where (i.e., which computer on the Internet) to deliver an internet message. Currently, there are two versions of IP addresses: IPv4 and IPv6. IPv4 IP addresses are 32 bits long and typically represented with 4 octets, each of which contains one to three digits, with a single dot (.) separating each number or set of digits. Each of the four numbers can range from 0 to 255. The following is an example of an IPv4 address: 72.129.0.209. The next generation of IP addresses (IPv6) are 128 bits long, written in hexadecimal, and separated by colons. An example of an IPv6 address is: 3ffe: 1900:4545:3:200:f8ff:fe21:67cf. IP addresses ensure that messages sent over the Internet, as well as requests for data and requested data, will reach the correct destination.

IP addresses may be static or dynamic. A static IP address identifies a particular computer and remains the same every time that computer connects to the Internet. Dynamic IP addresses are assigned at the time a computer connects to a network and they can change for particular device over time. Further a device may use a different IP address to connect to a network when the device changes geographical location.

Matching an IP address to a geographical location is form of geolocation. However, it may be difficult to determine the geolocation of an IP address. The most precise way to determine geolocation is to use positioning systems such as GPS. Unfortunately, this information is not available for the majority of users because the users are not using a device with GPS or the user has not given the search engine permission to use the device's GPS information. Another method to determine geolocation is to ask the user to self-report it. While this might be accurate in the short-run, in the long-run the user might move to another location without updating the self-reported location. Yet another solution is to use location information extracted from user queries to determine geolocation information. For example, if an IP address is often used to search for queries such as "weather in Seattle", "restaurants in Seattle", "plumbers near Seattle", then it may be assumed that that IP address is geolocated in Seattle. Or if a group of users with consecutive IP addresses often searches for items in Denver, it may be assumed that the cohort of IP addresses is located in Denver. However, this method is not useful for a majority of IP addresses because there is not enough data (e.g., search histories with location information) and/or the IP addresses are not part of a cohort.

Still yet another method to determine the geolocation of an IP address is to consult an IP geolocation database. These databases contain ranges of IP addresses that are mapped to corresponding physical location information. The physical location information may be in the form of geographical coordinates for a specific location or sets of coordinates (e.g., minimum and maximum longitude coordinates and a minimum and maximum latitude coordinates) that define a geographical area. The granularity of the geolocation databases varies from large areas, such as regions or cities, to very specific locations, such as neighborhoods. The physical location information in the IP Geolocation databases comes from a variety of sources, such as IANA, Internet Service Providers (ISPs), and various national and local Internet registries, who self-report this information. However, conventional IP Geolocation databases often contain inaccurate and incomplete location information. Further, geolocation information is not available for many IP addresses.

It is with respect to these and other general considerations that aspects of the technology have been made. Also, although relatively specific problems have been discussed, it should be understood that the aspects of the technology presented should not be limited to solving the specific problems identified in the background.

SUMMARY

The disclosure generally relates to systems and methods for determining accurate geolocation for networks (e.g., IP addresses) for which geolocation information in unknown. Various techniques are described for determining the physical location of networks by tracking user movement across different networks, and more particularly by tracking user movement from networks with known geolocation to networks with unknown geolocations. Aspects of the technology use time and network address information (e.g., IP addresses) from user's queries and combine this information with known geolocation information to create new, high quality, geolocation mappings for networks whose geolocation is unknown.

As used herein, a "Network" is an IP address or range of IP addresses that is associated with a particular device or group of devices. Many devices can connect to a public network from the same IP Address and therefore create a given Network of devices, which are often associated with a given physical location. For example, a LAN for an entity enterprise is a Network with a range of IP addresses associated with particular devices. A "Known Network" is a Network that has high quality (e.g., relatively accurate) geolocation information associated with it. In other words, it is an IP Address (or range) whose physical location is known. An "Unseen Network" is a Network whose physical location is unknown either because there is no accurate information mapping its IP address to a physical location or because there is no geolocation information at all.

In embodiments of the present invention, the system learns user transitions over time, where each user transition is for a particular user who moves between Known Network and Unseen Network. Particular users are identified by an identification number, such as a Client ID. The user transition information is merged with the geolocation information for the Known Networks to predict geolocation for the Unseen Network.

A weighted average prediction algorithm may be used to predict geolocation information for an Unseen Network. The geolocation information for each Known Network that has a transition with the Unseen Network is weighted by the count of the transitions with the Unseen Network and then the weighted geolocation information is averaged to create a weighted average geolocation prediction for the Unseen Network.

An extreme prediction algorithm may be used, either alone or in combination with the weighted average prediction algorithm, to predict geolocation information for an Unseen Network. The geographic coordinates for each Known Network that has a transition with the Unseen Network are compared to fine the extreme coordinates for all of these Known Networks. For example, the smallest and largest latitude coordinates are identified and the smallest and largest longitude coordinates are identified to create a geolocation polygon comprising an extreme geolocation prediction for the Unseen Network.

In an embodiment of the present invention, the weighted average geolocation prediction is compared with the extreme geolocation prediction to determine a ratio between the two. If the ratio is too big, the geolocation predictions are determined to be inaccurate. If the ratio is less than a predetermined amount, the prediction is considered to be an accurate determination of the geolocation of the Unseen Network. In aspects, the status of such a Network may be changed from Unseen to Known and its determined geolocation information may be stored for future use in mapping additional Unseen Networks.

It will be appreciated that this Summary is provided to introduce a selection of concepts that are further described below in the Detailed Description section. This Summary is not intended to identify key features or essential features of the claimed subject matter.

BRIEF DESCRIPTION OF THE DRAWINGS

FIG. 7 depicts a sorted request log in accordance with an embodiment of the present invention.

FIG. 8 depicts a user transition log in accordance with an embodiment of the present invention.

DETAILED DESCRIPTION

Figure 1:
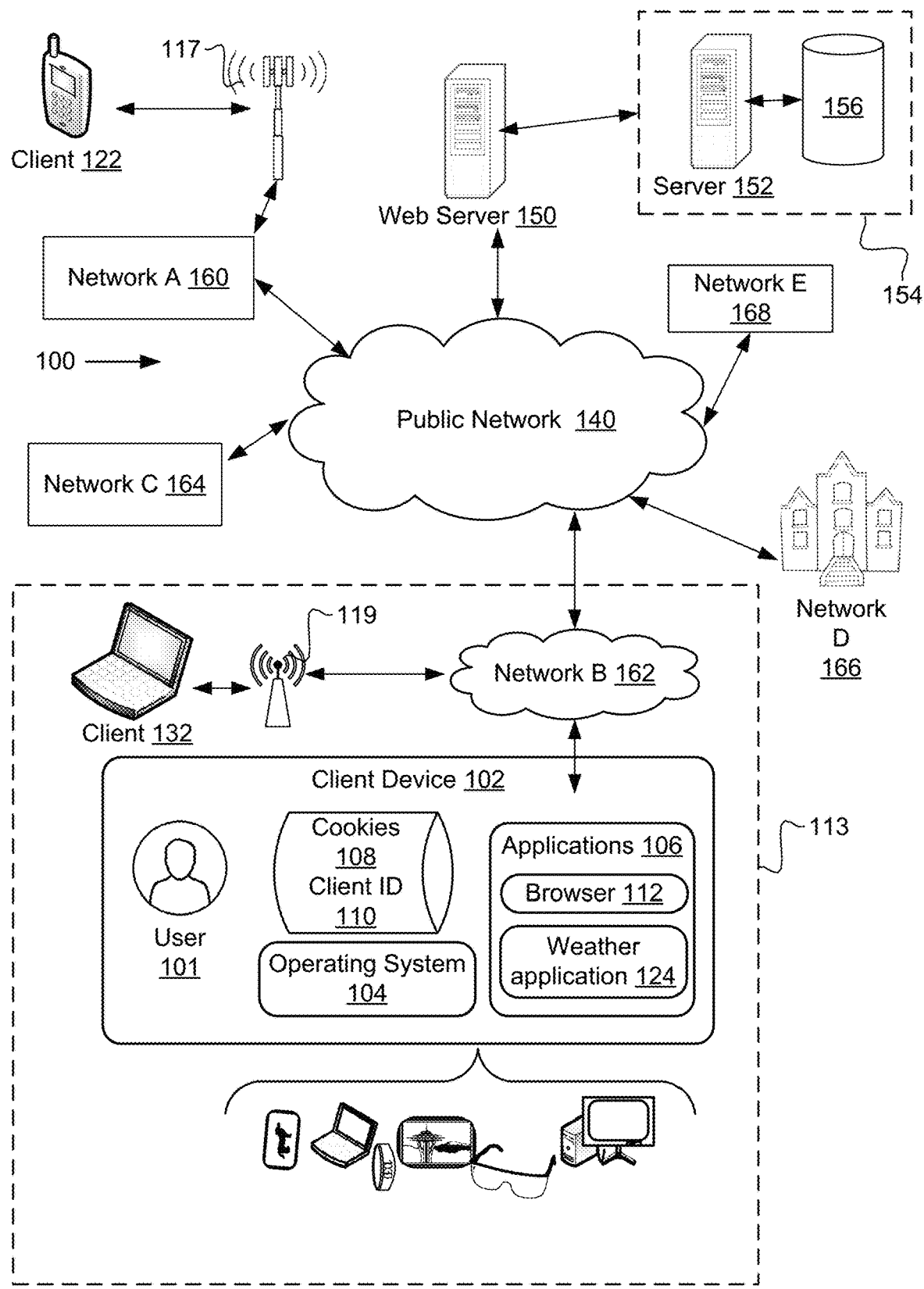
FIG. 1 illustrates a networked-computing environment for determining geolocation of an IP address.

The disclosure will now describe in detail exemplary embodiments with reference to the accompanying figure, in which the exemplary embodiments are shown. Other aspects may, however, be embodied in many different forms and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals. Objects depicted in the figures that are covered by another object, as well as the reference annotations thereto, are shown using dashed lines. Optional steps or modules are also shown using dashed lines.

Systems and methods are disclosed herein to for obtaining accurate geolocation information for IP addresses. Methods are disclosed for collecting information about user queries that does not depend on knowledge of the user's location, which allows for a determination of a user's movement across IP Addresses. The invention uses knowledge about the IP Addresses from which users send queries in combination with geolocation information (e.g. GPS and reverse IP mappings) to build a database of information about user movement over time. The invention further combines this information with current Reverse IP Mappings to identify and determine geolocation for networks whose geolocation information is unknown. By creating these mappings, when a user queries the system, but does not supply location data themselves, they can still be served an accurate location allowing for improved search results, targeted services, and advertisements.

Various techniques are described for determining the physical location of IP addresses by tracking user movement across different IP addresses, and more particularly by tracking user movement from IP addresses with known geolocations to IP addresses with unknown geolocations. Aspects of the technology include using time and IP based information from user's queries and known geolocation information to create new, high quality, geolocation mappings.

FIG. 1 illustrates a logical representation of a network environment 100 in which users are provided access to one or more public communications networks 140, such as the Internet. Although only one public network is shown, network 140 may comprise multiple connected networks.

The network environment 100 also includes other networks that allow client devices to access the public network 140 and web servers 150, such as Network A 160, Network B 162, Network C 164, Network D 166, and Network E 168. As used herein, a "Network" is an IP address or range of IP addresses that is associated with a particular device or group of devices. Many users can connect to a public network from the same IP Address and therefore create a given Network of users, who are often associated with a given physical location. For example, a LAN for an entity enterprise, such as Network D 166, is a Network with a range of IP addresses associated with particular users. A "Known Network" is a Network that has high quality (e.g. relatively accurate) geolocation information associated with it. In other words, it is an IP Address (or range) whose physical location is known. An "Unseen Network" is a Network whose physical location is unknown either because there is no accurate information mapping its IP address to a physical location or because there is no geolocation information at all.

Figure 2:
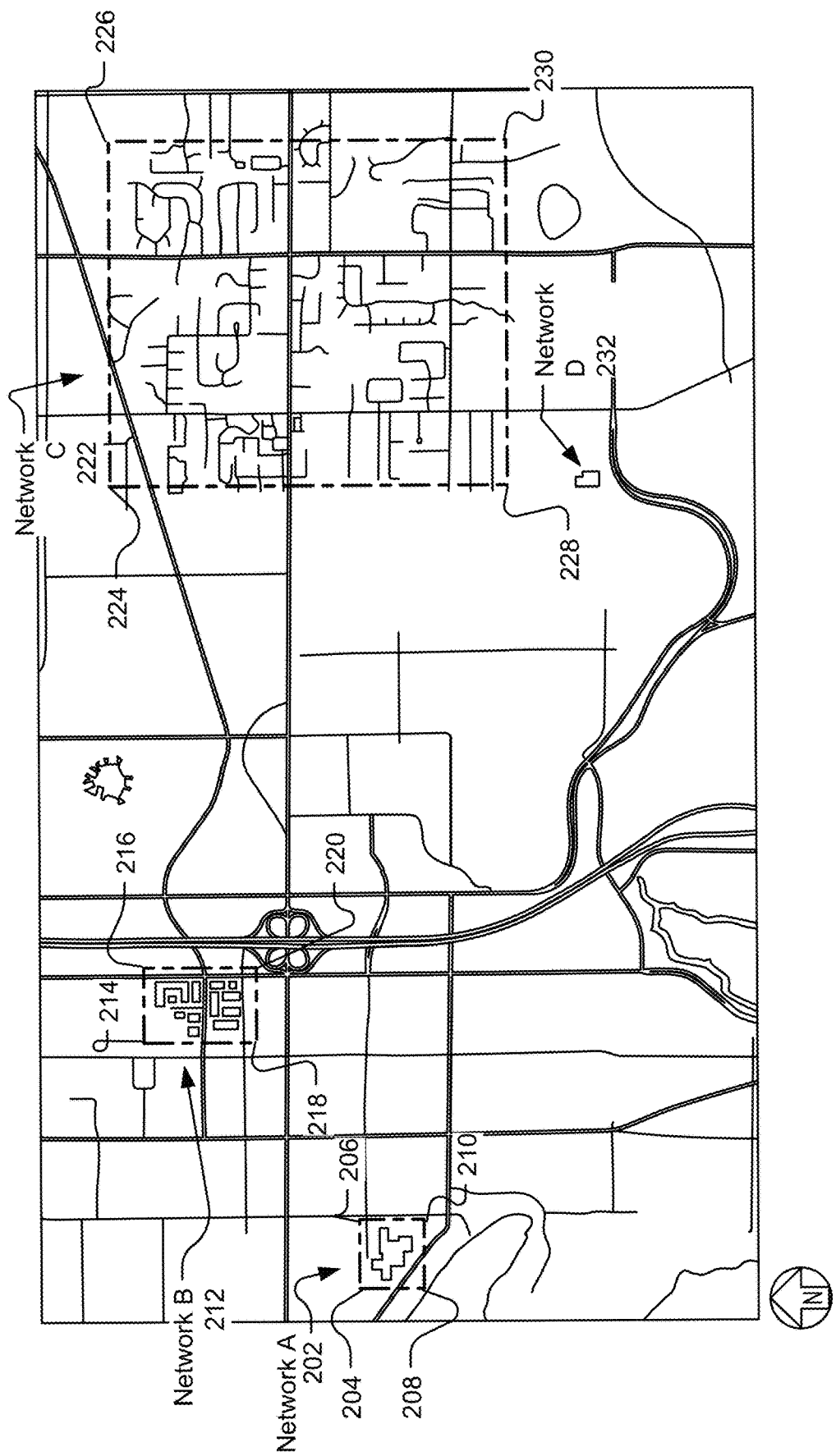
FIG. 2 depicts geolocation information for Known Networks A, B, C, and D shown in FIG. 1.

Networks A, B, C, and D are Known Networks whose geolocation information is known as shown in FIG. 2. For example, Network A 202 has geolocation boundaries defined by a polygon having four corners with geographic coordinates:

| Network A 202 | | |
|---|---|---|
| Corners | LATITUDE | LONGITUDE |
| 204 (NW) | 47.619241 | −122.201706 |
| 206 (NE) | 47.619241 | −122.198959 |
| 208 (SW) | 47.617505 | −122.201706 |
| 210 (SE) | 47.617505 | −122.198959 |

Network B 212 has a geolocation boundaries defined by a polygon having four corners with geographic coordinates:

| Network B 212 | | |
|---|---|---|
| Corners | LATITUDE | LONGITUDE |
| 214 (NW) | 47.621868 | −122.188222 |
| 216 (NE) | 47.621868 | −122.185647 |
| 218 (SW) | 47.618831 | −122.188222 |
| 220 (SE) | 47.618831 | −122.185647 |

Network C 222 has geolocation boundaries defined by a polygon having four corners with geographic coordinates:

| Network C 222 | | |
|---|---|---|
| Corners | LATITUDE | LONGITUDE |
| 224 (NW) | 47.627932 | −122.153633 |
| 226 (NE) | 47.627932 | −122.132248 |

| Network C 222 | | |
|---|---|---|
| Corners | LATITUDE | LONGITUDE |
| 228 (SW) | 47.609831 | −122.153633 |
| 230 (SE) | 47.609831 | −122.132248 |

Network D 232 is a building with its geolocation defined by a single set of coordinates:

| Network D 232 | |
|---|---|
| LATITUDE | LONGITUDE |
| 47.607393 | −122.150996 |

Network E is an Unseen Network whose geolocation information is unknown.

Returning to FIG. 1, the network environment 100 is not limited to any particular implementation and instead embodies any computing environment upon which user devices may connect to a public network using an IP address. A "user" is any person using a computing device to access one or more public communications networks. For example, user 101 uses a client device 102 to connect to the public network 140 through a LAN such as Network B 162. The client device 102 can be embodied as any device that is capable of using an IP address to connect to a public network, such as, by way of example and not limitation, a smartphone, a tablet computer, a portable computer (e.g., a laptop), a desktop computer, a wearable device, and so forth. One of a variety of different examples of a client device 102 is shown and described below in FIGS. 14, 15A and 15B. The client device 102 and/or LAN 162 may be protected from the public network 140 by a firewall, shown by dashed line 113.

The client devices, such as client 102, include a variety of different functionalities that enable various activities and tasks to be performed. For instance, the client device 102 includes an operating system 104 and applications 106. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 are representative of functionality to enable various tasks and activities to be performed via the client device 102, such as word processing, web browsing, email, social media, enterprise tasks, and so forth. For example, the applications 106 include a browser 112 that allows client 102 to connect to a public network 140 (such as the internet) and web servers 150 and a weather application 124 that also allows client 102 to connect to the public network 140 and web servers 150. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The network environment 100 includes many other client devices, such as client 122 and client 132. Although client 122 is shown as a mobile phone and client 132 is shown as a mobile computer, the client devices may be any device that is capable of connecting to a public network using an IP address. In an embodiment, client 122 connects to the public network 140 through cell tower 117 and network A 160 and client 132 connects to the public network 140 through wireless access point 119 that is connected to Network B 162. However, clients may connect to the public network in any suitable way. Further, although the clients are shown as connected through particular networks (e.g., client 132 connects to the Internet through network B 162), the clients may move physical location and/or change their logical connections and connect to the public network 140 through any number of Networks.

One or more web servers 150 are also connected to the public network 140 and in communications with client devices, such as clients 102, 122, and 132. While only one web server 150 is shown, more than one server computer or separate servers, e.g., a server farm, may be used in accordance with an embodiment of the present invention. The system 100 further involves a backend computer system 154, which may provide a search engine service or other web based service. The backend system may include, for example, one or more servers 152 and one or more databases 156 for storing information in accordance with the present invention. One of a variety of different examples of a server 150 and 152 is shown and described below in FIG. 13.

In accordance with an embodiment of the present application, a user 101 may send requests for information or resources using one or more of the applications 106 through a Network, such as Network B 162, and the public network 140 to web servers 150, which receive and respond to the request and provide the requested information or resources. For example, user 101 may use a web browser 112 on client 102 to send a search query through the public network 140 (internet) to web servers 150. The web servers 150 will receive a user's search query and deliver search results back to the user in response to the query.

When a user enters a search query, their query is tagged with a client identifier, such as a Client ID 110, which may be stored on the client device 102 as a cookie 108. The client ID 110 may be tied to a particular person and used for queries made by that person on different client devices. For example, the Client ID 110 may be tied to a log-in credentials for a particular service, such as a Microsoft User ID. That Client ID will be used every time thereafter that that user makes a request over the Internet when logged into that service. In another embodiment, the Client ID may a randomly generated tag that is tied to a particular client device or a particular application on a particular client device. For example, user 101's mobile phone may have one Client ID and her laptop computer may have another Client ID. As another example, the Client ID may be tied to a particular application on the client 102. Browser 112 may have a different Client ID associated with it than the weather application 124. In any case, further queries from the same user and/or computing device and/or application use this same client ID 110 to associate these queries with the same user 101 and/or device 102.

Learning User Transitions Over Time

FIGS. 3-8 illustrate a process for learning user transitions over time in accordance with embodiments of the present invention. A "user transition" occurs when a particular user or client device changes the IP Address that is used to send a request over a public network. A request can be any kind of message sent using an IP address over one or more public networks. A search query is an example of such a request. A user transition can be detected by comparing an IP Address used to send each of a pair of consecutive requests. If the IP address is different, a user transition has occurred.

The first step in this process is to identify and aggregate user transitions. Using user query logs, each uniquely identified user's queries are aggregated together with all of their queries over a given time span. Then the process goes through each user query, and using the time stamp associated with it, finds the most recent pair of consecutive queries (before and after), that are queried from different IP addresses. The output of this step is a dataset of all User Transitions that occur over a given time frame. At this point each point of data consists of a Before IP Address, an After IP Address, and the time elapsed between the two queries.

Figure 3:
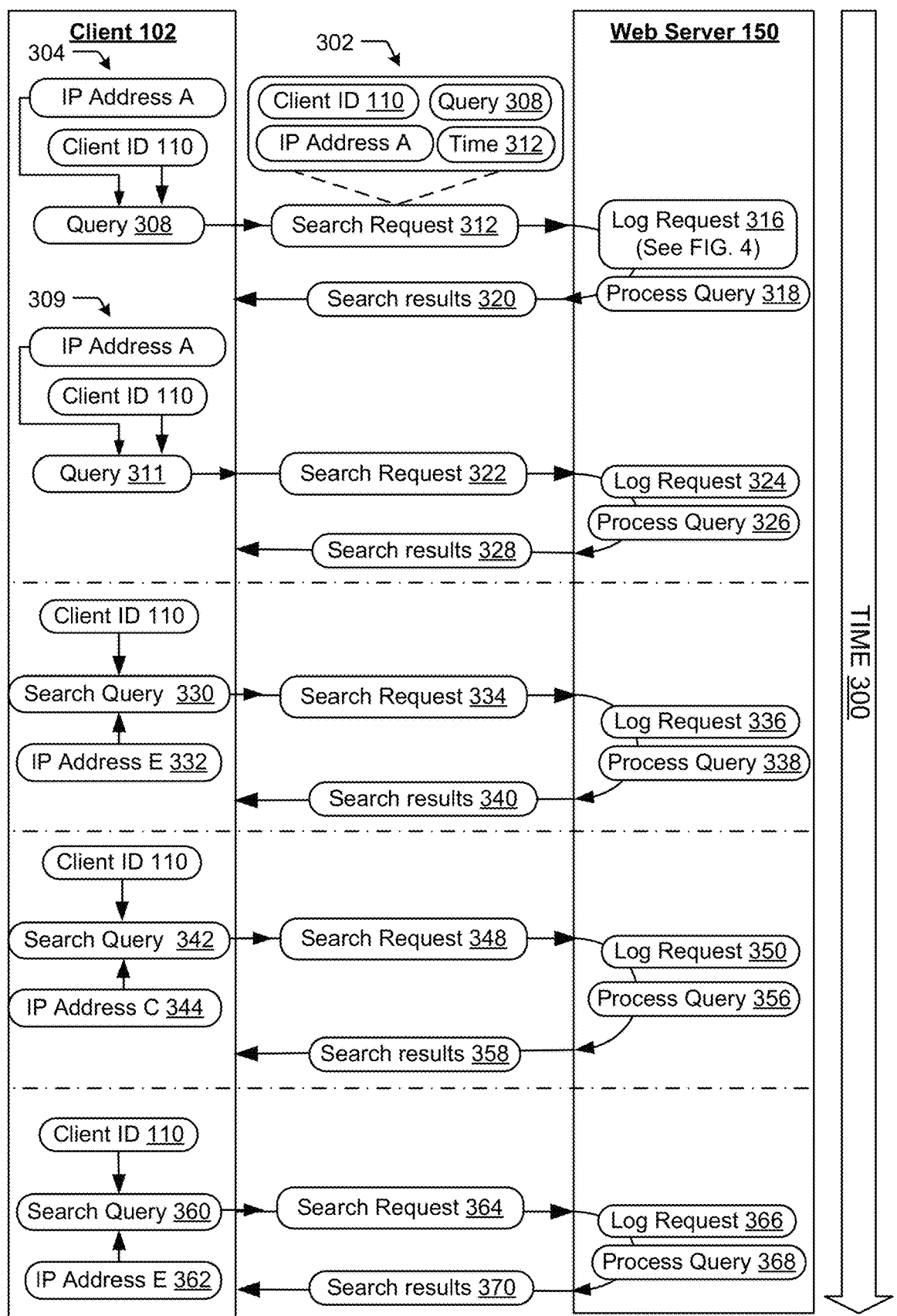
FIG. 3 illustrates a process for learning user transitions over time in accordance with an embodiment of the present invention.

FIG. 3 shows an embodiment for gathering information about user transitions for user 101 (FIG. 1) and/or client device 102 (FIG. 1) over time as shown by arrow 300. At step 302, client device receives a search query 308 or other request from user 101. The request may have been made in any of the applications 106 on client 102, such as the browser application 112 or the weather application 124. For example, user 101 may have used the browser application 112 on the client 102 to access a search engine webpage via web server 150. As discussed above, the client 102 needs an IP address to send information, such as search requests, over the Internet. Typically, the IP Address used by a client device is not static and changes over time. At step 304, client 102 accesses the internet using IP Address A (e.g. Network A 160 as shown in FIGS. 1 and 2). If client 102 does not have a Client ID 110 currently, a client ID is randomly generated and stored as a cookie.

At step 312, client 102 sends a search request to web server 150 with the query 308, the client ID 110 (discussed in connection with FIG. 1) associated with user 101 and/or client 102 and the IP Address A associated with the access point that is being used to send the search request 312 to web server 150. The search request also includes a time stamp 312 that marks the time that the search request was sent. At step 316, the web server 150 receives the search request and logs the request using the process shown in FIG. 4. At step 318, the web server processes the query to retrieve search results 320 that respond to the query 308. At step 328, the web server 150 sends the search results back to client 102.

At a later point in time 309, client 102 receives query 311 and sends a search request 322 using IP Address A (e.g., Network A 160 in FIGS. 1 and 2). Although not shown in FIG. 3, search request 322 also includes the Client ID 110 for user 101 and/or client 102, IP Address A, and a time stamp that marks the time request 322 was sent. Server 150 logs the request at step 324, processes the query at step 326, and sends the search results back to client 102 at step 328.

At a later point in time 300, client 102 receives a search query 330. Client 102 sends a search request 334 over the Internet using IP Address E 332 (e.g., Network E 168 in FIG. 1). There are many reasons that client 102 may be using a different IP Address to send search request 334 than it used to send search requests 322 and 312. For example, user 101 and/or client 102 may have moved physical locations. Or user 101 may be using a different client device (such as client 122 or client 132) to send the search request 334. Or client 102 may have been disconnected from the Internet or otherwise assigned a different IP address at the time search request 334 was sent. Although not shown in FIG. 3, search request 334 also includes the Client ID for user 101 and/or client 102, IP Address E 332 that is associated with the access point being used to send the search request 334 over the public network, and a time stamp that marks the time request 334 was sent. Server 150 logs the request at step 336

(as described in more detail in connection with FIG. 4), processes the query at step 338, and sends the search results back to client 102 at step 340.

At a still later point in time 300, client 102 receives a search query 342. At this point, client 102 is connected to the Internet using IP Address C 344 (e.g., Network C 164 in FIGS. 1 and 2). Client 102 sends a search request 348 with query 342 over the Internet using IP Address C 344. Although not shown in FIG. 3, search request 348 also includes the Client ID 110 for user 101 and/or client 102, IP Address C, and a time stamp for request 348. Server 150 logs the request at step 350 (as described in more detail in connection with FIG. 4), processes the query at step 356, and sends the search results back to client 102 at step 358.

At a still later point in time 300, client 102 receives a search query 360. At this point, client 102 is connected to the Internet using IP Address E 362. Client 102 sends a search request 364 with query 360 over the Internet using IP Address E 362. Although not shown in FIG. 3, search request 364 also includes the Client ID 110 for user 101 and/or client 102, IP Address E 362, and a time stamp for request 364. Server 150 logs the request at step 366 (as described in more detail in connection with FIG. 4), processes the query at step 368, and sends the search results back to client 102 at step 370.

Figures 4, 5:
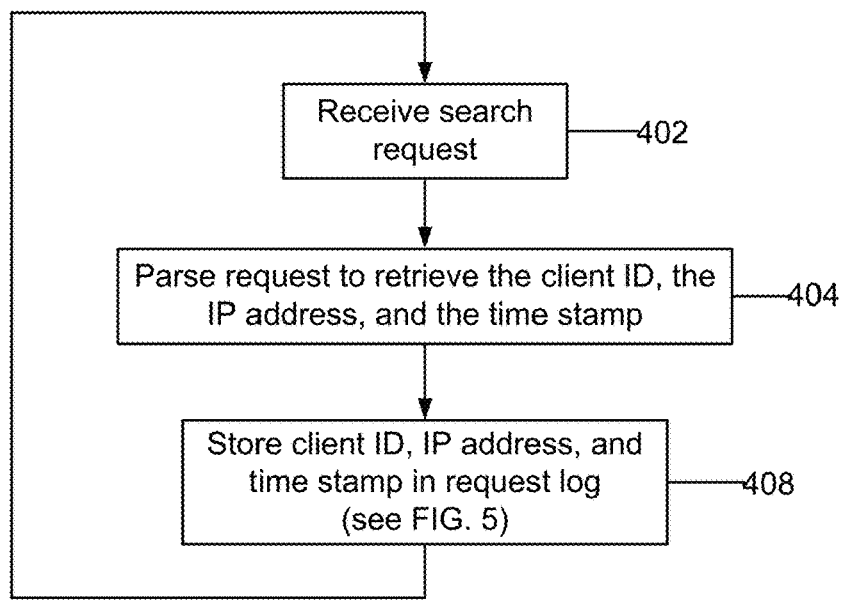
FIG. 4 illustrates a process for creating a request log in accordance with an embodiment of the present invention.
FIG. 5 depicts a request log in accordance with an embodiment of the present invention.

FIG. 4 illustrates a process for logging requests (such as logging requests 316, 324, 336, 350, and 366 in FIG. 3) to create a request log (see FIG. 5) to track user transitions over time. At step 402, a request, such as a search request, is received from a client. The request may be received at a web server 150 or a backend server, such as server 152 in FIG. 1, or any other computing device. At step 404, the server parses this request to retrieve the Client ID, the IP Address, and the time stamp. Next, at step 408, it logs this data in a search request log, such as the request log 500 shown in FIG. 5.

FIG. 5 illustrates a request log in accordance with an embodiment of the present invention. The log 500 includes three fields: client ID field 502, which indicates which client sent the request, IP Address field 504, which indicates which IP Address the request came from, and time stamp field 506, which indicates what time the request was sent. For example, the second request 508 logged in log 500 corresponds to search request 312 (FIG. 3) sent from client 102 to web server 150 from IP Address A at 10:10:00. The fourth request 510 logged in log 500 corresponds to search request 322 (FIG. 3) sent from client 102 to web server 150 from IP Address A at 11:15:00. The fifth request 512 logged in log 500 corresponds to search request 334 (FIG. 3) sent from client 102 to web server 150 from IP Address E at 11:16:00. The twelfth request 514 logged in log 500 corresponds to search request 348 (FIG. 3) sent from client 102 to web server 150 from IP Address C at 13:18:00. The thirteenth request 516 logged in log 500 corresponds to search request 364 (FIG. 3) sent from client 102 to web server 150 from IP Address A at 15:40:00. Request log 500 is not limited to any particular implementation or format and instead embodies any type of log that allows for recording information that allows requests and queries to be associated with a particular user such that user transitions from one Network to another Network may be tracked over time. So for example, while request log 500 shows three columns of information, the request log may include additional columns and may be organized in a different order or format. Further, while request log 500 includes entries for three different client IDs, the log may have more or less client IDs. Request log may be stored in a database, such as database 156 in FIG. 1, or in any other place or format.

Figure 6:
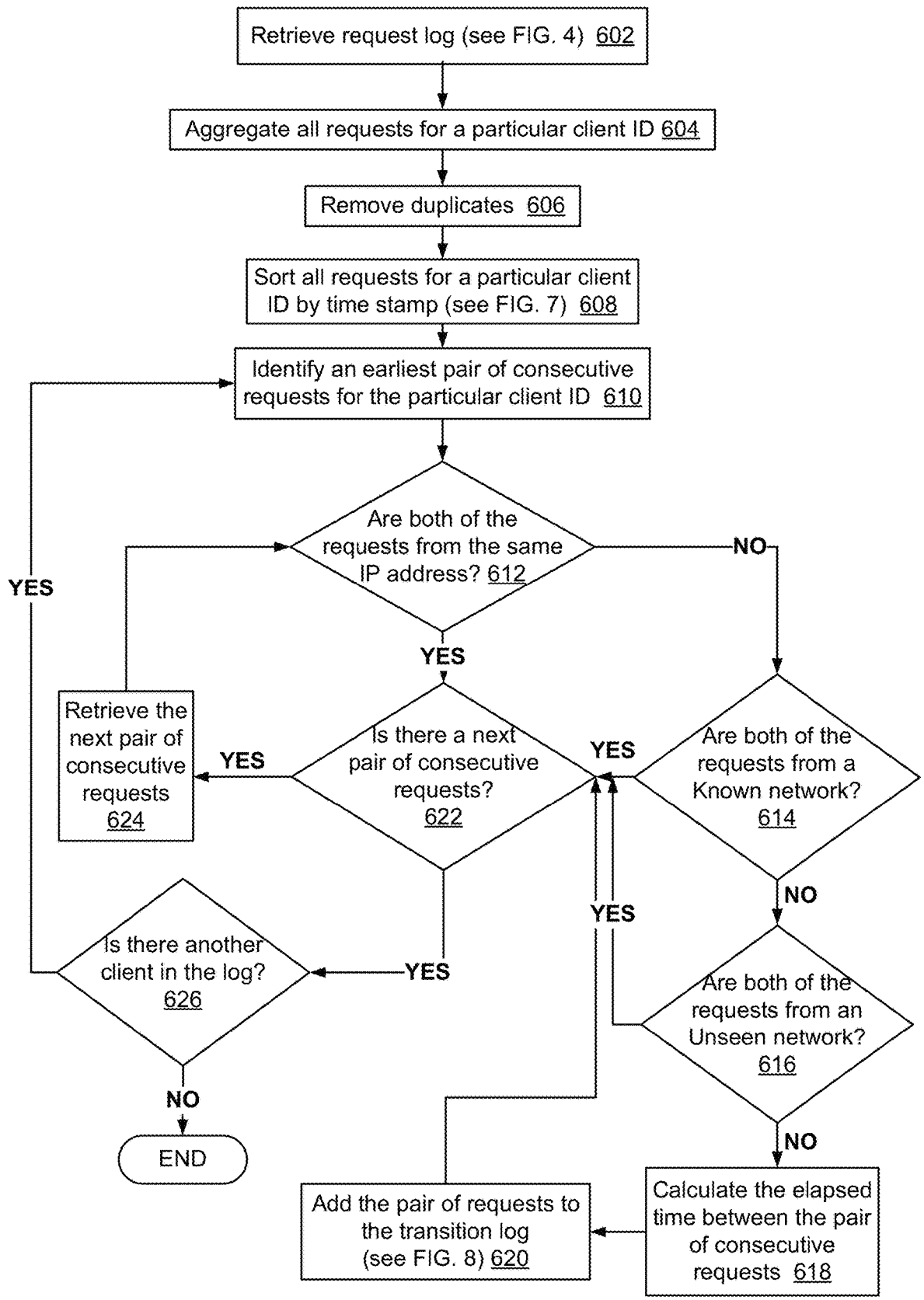
FIG. 6 illustrates a process for creating a user transition log in accordance with an embodiment of the present invention.

FIG. 6 illustrates a process for transforming the information in a request log, such as Request Log 500, into a transition log 800 shown in FIG. 8. The purpose of this transition log is to identify User Transitions from a Known Network to an Unseen Network or vice versa, which will allow for determining geolocation information for Unseen Networks in the next section.

At step 602, a request log (such as log 500) is retrieved. In an embodiment, the log is retrieved periodically, such as once every 24 hours. At step 604, the requests from the log are aggregated for each particular client ID. For example, the log may be sorted by Client ID so that all requests for a particular ID are grouped together. At step 606, any duplicate entries are removed. A duplicate entry should have at least the same Client ID, IP Address, and time stamp. At step 608, all of the requests for each Client ID are sorted by time stamp to create a new log in chronological order, such as log 700 shown in FIG. 7.

In FIG. 7, all of the requests for client 102 from Request Log 500 are aggregated into a group 708. All of the requests for client 122 from Request Log 500 are aggregated into a group 710. All of the requests for client 132 from Request Log 500 are aggregated into group 712. Further, all of the requests in each group are sorted in chronological order. So, for example, the five requests for Client 102 (as identified by a single Client ID for client 102 and/or user 101) are organized where the earliest request 714 (which corresponds with search request 312 in FIG. 3) is listed first in group 708. The next consecutive request in time for client 102's client ID is request 716, which corresponds with search request 322 from FIG. 3, and is listed below request 714. The next consecutive request in time for client 102's client ID is request 718, which corresponds with search request 334 from FIG. 3, and is listed below request 716. The next consecutive request in time for client 102's client ID is request 720, which corresponds with search request 348 from FIG. 3, and is listed below request 718. And the next (and last) consecutive request for client 102's client ID is request 722, which corresponds with search request 364 from FIG. 3, and is listed below request 720.

Returning to FIG. 6, an earliest in time pair of consecutive requests for a particular Client ID is identified at step 610. The earliest pair of requests for client 102 is request 714 and 716 from FIG. 7, copied below:

| Client ID | IP Address | Time Stamp |
|---|---|---|
| 102 | A | 11.00.00 |
| 102 | A | 11.15.00 |

At step 612, the system determines whether each of the pair of requests originated from the same Network (e.g., IP Address). When a pair of requests originate from the same IP Address, there is no User Transition as defined herein and this data is disregarded. In this case, requests 714 and 716 both originated from IP Address A ("YES" at 612), so the process moves to step 622, where the system looks for next pair of consecutive requests. If there is another pair ("YES" at 622), the system moves to step 624.

At step 624, the next pair of consecutive requests from log 700 in FIG. 7 is request 716 and 718, copied below.

| Client ID | IP Address | Time Stamp |
|---|---|---|
| 102 | A | 11.15.00 |
| 102 | E | 11.16.00 |

The system determines at step 612 whether each of these requests originated from the same IP Address. They did not ("NO" at step 612), so the process moves to step 614 to determine if both requests are from a Known Network. When both requests come from a Known Network, the User Transition does provide any useful information with regard to geolocation of an Unseen Network, so this information is disregarded. As discussed above with references to FIGS. 1 and 2, Networks A, B, C, and D are Known Networks because the system has accurate geolocation information for these Networks. Network E is not a Known Network. In this case the pair of requests did not both come from a Known Network ("NO" at 614), so the process proceeds to step 616. Here, the system determines whether both requests came from an Unseen Network, which if so, is not useful to determining the geolocation of an Unseen Network. These particular requests did not both come from an Unseen Network ("NO" at step 616), so the process proceeds to step 618 where the elapsed time between request 716 and 718 is calculated. At step 620, the pair of consecutive requests 716 and 718 are added to a User Transition Log.

FIG. 8 shows a User Transition Log 800 in accordance with an embodiment of the present invention. Log 800 includes fields relating to the Client ID 810 for the pair of consecutive requests, the Known IP Address 812, the Unknown IP Address 814, and Time Elapsed 816 (calculated at 618 of FIG. 6) between the pair of requests. For example, the first entry of log 800 corresponds to requests 716 and 718 of FIG. 7, where the Client ID comes from client 102, the Known IP Address from the transition was IP Address A, the Unseen IP Address from the transition was IP Address E, and the time elapsed between these requests was 1 minute.

Returning to FIG. 6, the process moves from step 620 to step 622, where the system looks for next pair of consecutive requests. If there is another pair ("YES" at 622), the system moves to step 624. At step 624, the next pair of consecutive requests from log 700 in FIG. 7 is request 718 and 720, copied below.

| Client ID | IP Address | Time Stamp |
|---|---|---|
| 102 | E | 11.16.00 |
| 102 | C | 13.18.00 |

This pair of requests will be logged into the user transition log because they originated from different IP Addresses ("NO" at 612) and originated from a Known IP Address C and an Unseen IP Address E ("NO" at 614 and 616). The same is true for the last pair of requests 720 and 722, so they too will be logged at step 620.

When the method proceeds to step 622 after logging the last request for client 102, the system will determine that there is not another set of consecutive requests for client 102 ("NO" at 622) and the method will proceed to step 626 to determine if there is another group of requests for a different client ID. If so ("YES" at 626), the method goes back to step 610 to start working on the next particular client ID. In this example, the next client ID is for client 122 and is shown by group 710 in FIG. 7. All of the requests in group 710 will be logged in the user transition log except the pair of consecutive requests 724 and 726 because both of these originated from the same IP Address ("NO" at step 612).

Likewise, all of the pairs of requests in group 712 for client 132 will be logged except for requests 728 and 730 because both of these originated from an Unseen Network ("NO" at step 616). When there are no more requests for any other client ("NO" at 626), the user transition log is complete and the process ends.

Predicting Geolocation for Unseen Networks

FIGS. 9-12 illustrate processes for accurately predicting and determining geolocation of Unseen Networks using the User Transitions learned from the section above and other information, such as geolocation information for the Known Networks, in accordance with embodiments of the present invention. More specifically, the output of the previous section gives a large dataset of all User Transitions from a Known Network to an Unseen Network over time. This dataset is combined with reverse IP mappings to predict the geolocation of the Unseen Network. Reverse IP mappings consist of IP Addresses for the Known Networks associated with geographic coordinates for a number of points that form a polygon that defines the geographic area they cover (as shown in FIG. 2 and described above).

In an embodiment of the present invention, a weighted prediction algorithm is used to determine geolocation of an Unseen Network. This algorithm determines a weighted average of the coordinates of each corresponding point (e.g., corner) of the geolocation polygon for each Known Network that feeds into the Unseen Network. The coordinates of the corresponding points for each Known Network are weighted by the count of transitions from that Known Network to the Unseen Network to give a weighted average set of coordinates for each corresponding point of the Unseen Network. So for example, if each of the geolocation polygons of the Known Networks are a square, there will be four corners (e.g., points) to be averaged, which will be referred to as corner 1 (NW), corner 2 (NE), corner 3 (SW), and corner 4 (SE). For each corner, there will be two coordinates: longitude and latitude. The weighted average prediction algorithm will thus provide 8 data points for the geolocation of the Unseen Network, comprising:

Corner 1 (NW: longitude, latitude);
Corner 2 (NE: longitude, latitude);
Corner 3 (SW: longitude, latitude); and
Corner 4 (SE: longitude, latitude).

Figure 9:
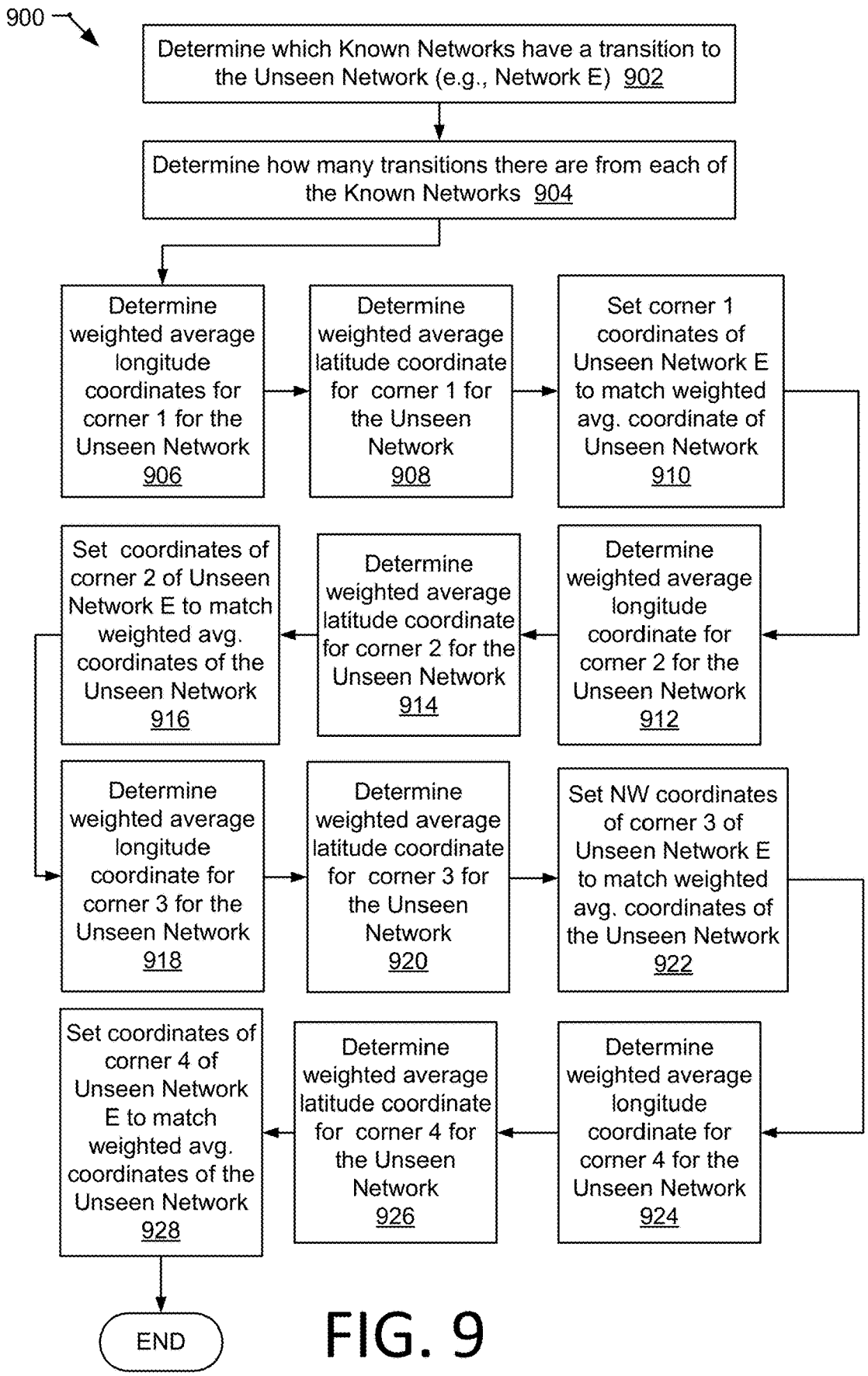
FIG. 9 illustrates a process for determining a weighted average geolocation prediction for an unseen network in accordance with an embodiment of the present invention.

FIG. 9 illustrates an embodiment for predicting geolocation information for Unseen Networks using a weighted prediction algorithm 900. At step 902 the system determines which Known Networks have a User Transition to the Unseen Network at issue. For example, the User Transition Log 800 from FIG. 8 shows that there are 4 Known Networks that have at least one transition with Unseen Network E.

At step 904, the count of transitions from each Known Network to the Unseen Network are determined. For example, the output of step 904 for User Transition Log 800 is shown below:

| Known IP Address | Unseen IP Address | No. of Transitions |
|---|---|---|
| A | E | 1 |
| B | E | 3 |

| Known IP Address | Unseen IP Address | No. of Transitions |
|---|---|---|
| C | E | 2 |
| D | E | 2 |

Next, the weighted average for the longitude coordinate for the first corner of the Known Networks is calculated at step 906. In an embodiment, the formula used to calculate the weighted average prediction for the longitude for corner 1 for Network E using the User Transitions from Log 800 is set forth below, where T is the count of transitions, C1 is for the NW corner of each Known Network, and "Long" is the longitude coordinate:

$$= \frac{(A_{C1}(\text{Long})^*T{:}A \leftrightarrow E) + (B_{C1}(\text{Long})^*T{:}B \leftrightarrow E) + (C_{C1}(\text{Long})^*T{:}C \leftrightarrow E) + (D_{C1}(\text{Long})^*T{:}D \leftrightarrow E)}{(T{:}A \leftrightarrow E + T{:}B \leftrightarrow E + T{:}C \leftrightarrow E + T{:}D \leftrightarrow E)}$$

At step 908, the weighted average latitude coordinates are determined using the same formula except that "Lat" is the latitude coordinates for corner 1:

$$= \frac{(A_{C1}(Lat)^*T{:}A \leftrightarrow E) + (B_{C1}(Lat)^*T{:}B \leftrightarrow E) + (C_{C1}(Lat)^*T{:}C \leftrightarrow E) + (D_{C1}(Lat)^*T{:}D \leftrightarrow E)}{(T{:}A \leftrightarrow E + T{:}B \leftrightarrow E + T{:}C \leftrightarrow E + T{:}D \leftrightarrow E)}$$

Using the coordinates for corner 1 as shown in FIG. 2 and the transition counts from log 800, the weighted average prediction for Corner 1 (NW) of Network E=$E_{C1}$(Lat) is:

$$= \frac{(47.619241^*1) + (47.621868^*3) + (47.627932^*2) + (47.607393^*2)}{(1 + 3 + 2 + 2)} = 47.6168301$$

At step 910, the weighted average coordinates for corner 1 (e.g. the NW corner) of Network E's geolocation polygon is set to equal the sums of the formulas determined in steps 908 and 910, as shown below:

| Weighted Avg. Coordinates for Network E | | |
|---|---|---|
| | LATITUDE | LONGITUDE |
| Point 1 | 47.61683013 | −122.1719538 |

The process proceeds to step 912, where the weighted average longitude coordinate is determined for the second (e.g. NE) corner of the Known Networks. At step 914, the weighted average latitude coordinate is determined for the second (e.g. NE) corner of the Known Networks. At step 916, the weighted average coordinates for corner 2 of Network E's geolocation polygon is set to equal the sums determined in steps 912 and 914, as shown below:

| Weighted Avg. Coordinates for Network E | | |
|---|---|---|
| | LATITUDE | LONGITUDE |
| Point 2 | 47.61943688 | −122.1760953 |

The process proceeds to step 918, where the weighted average longitude coordinate is determined for the third (e.g. SW) corner of the Known Networks. At step 920, the weighted average latitude coordinate is determined for the third (e.g. SW) corner of the Known Networks. At step 922, the weighted average coordinates for corner 3 of Network E's geolocation polygon is set to equal the sums determined in steps 918 and 920, as shown below:

| Weighted Avg. Coordinates for Network E | | |
|---|---|---|
| | LATITUDE | LONGITUDE |
| Point 3 | 47.61569129 | −122.194964 |

The process proceeds to step 924, where the weighted average longitude coordinate is determined for the fourth (e.g. SE) corner of the Known Networks. At step 926, the weighted average latitude coordinate is determined for the fourth corner) of the Known Networks. At step 924, the weighted average coordinates for corner 4 of Network E's geolocation polygon is set to equal the sums determined in steps 924 and 926, as shown below:

| Weighted Avg. Coordinates for Network E | | |
|---|---|---|
| | LATITUDE | LONGITUDE |
| Point 4 | 47.618168 | −122.198959 |

Figure 10:
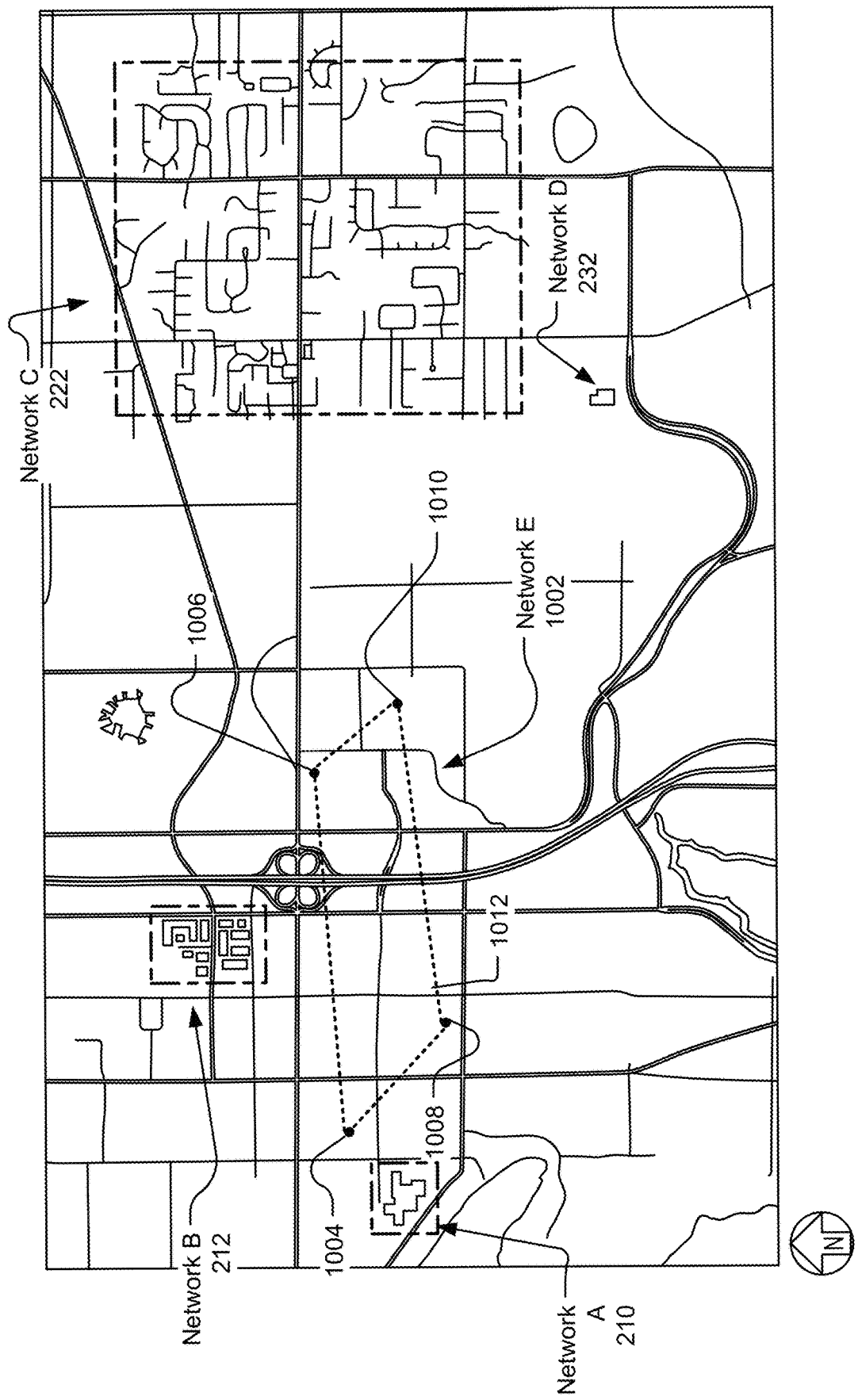
FIG. 10 depicts a weighted average geolocation prediction for an unseen network in accordance with an embodiment of the present invention.

FIG. 10 shows the resulting geolocation polygon for Network E 1002 using the weighted average prediction algorithm described in FIG. 9. Point 1 1004, point 2 1006, point 3 1008, and point 4 1010 create a polygon 1012 (dashed line) that defines the geolocation prediction for Network E according to the weighted average prediction described in FIG. 9.

In an embodiment of the present invention, an extreme prediction algorithm is used to determine geolocation of an Unseen Network. This algorithm identifies the most extreme points in any given direction for the combination of Known Networks that feed into the Unseen Network in question to create a new set of points that describe a polygon that fully contains all of the points of the contributing Known Networks.

Figure 11:
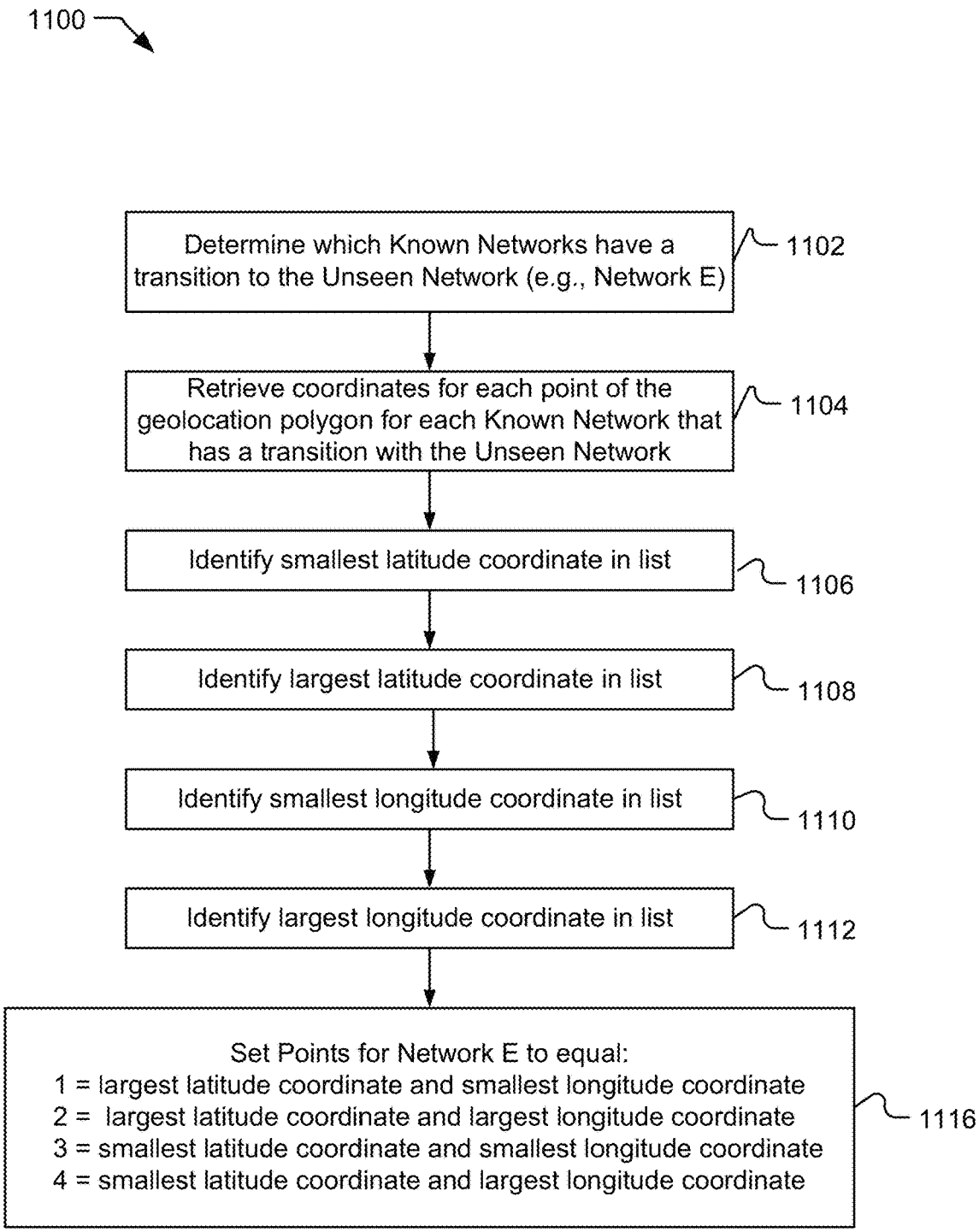
FIG. 11 illustrates a process for determining an extreme geolocation prediction for an unseen network in accordance with an embodiment of the present invention.

FIG. 11 illustrates an embodiment for predicting geolocation information for Unseen Networks using an extreme prediction algorithm 1100. At step 1102 the system determines which Known Networks have a User Transition to the Unseen Network at issue. For example, the User Transition Log 800 from FIG. 8 shows that there are 4 Known Networks (A, B, C, and D) that have at least one transition with Unseen Network E.

At step 1104, the system retrieves coordinates for each point of the geolocation polygon for each Known Network that has a transition to the Unseen Network, namely those Known Networks identified in step 1102. At steps 1106 and 1108, the smallest and largest latitude coordinates are identified. At steps 1110 and 1112, the smallest and largest longitude coordinates are identified. For example, for Known Networks A, B, C, and D, the following comprises the coordinates retrieved at step 1104. The bolded latitude coordinates are the smallest and largest identified in steps 1106 and 1108. The bolded longitude coordinates are the smallest and largest identified in steps 1110 and 1112.

|    | LATITUDE     | LONGITUDE    |
|----|--------------|--------------|
| A1 | 47.619241    | −122.201706  |
| A2 | 47.619241    | −122.198959  |
| A3 | 47.617505    | −122.201706 |
| A4 | 47.617505    | −122.198959  |
| B1 | 47.621868    | −122.188222  |
| B2 | 47.621868    | −122.185647  |
| B3 | 47.618831    | −122.188222  |
| B4 | 47.618831    | −122.185647  |
| C1 | 47.627932    | −122.153633  |
| C2 | 47.627932 | −122.132248 |
| C3 | 47.609831    | −122.153633  |
| C4 | 47.609831    | −122.132248  |
| D  | 47.607393 | −122.150996 |

At step 1116, the four points for the extreme geolocation prediction are set where the first point comprises the largest latitude coordinate and smallest longitude coordinate, the second point comprises the largest latitude coordinate and largest longitude coordinate, the third point comprises the smallest latitude coordinate and smallest longitude coordinate, and the fourth point comprises the smallest latitude coordinate and largest longitude coordinate.

Figure 12:
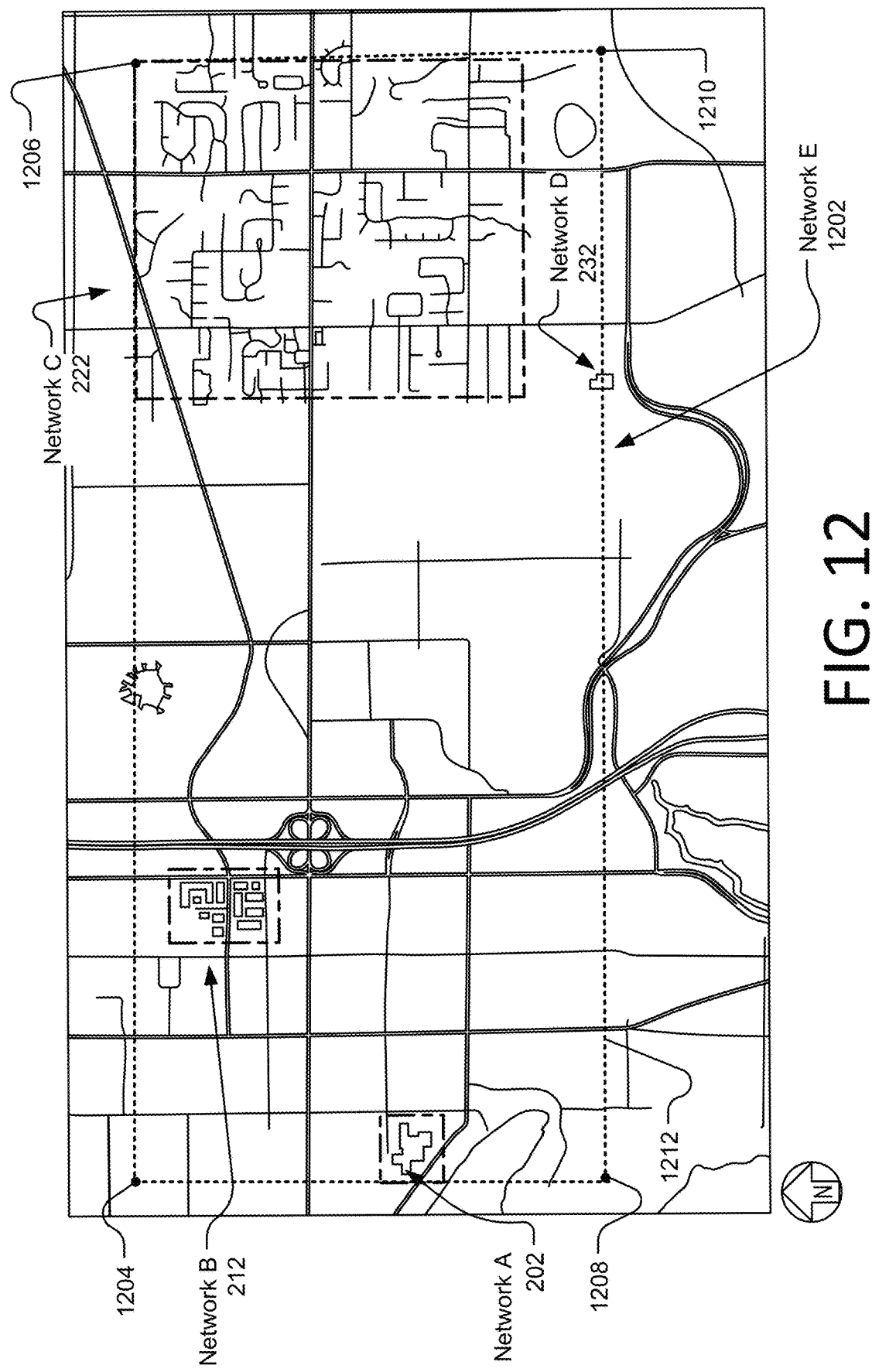
FIG. 12 illustrates an extreme geolocation prediction for an unseen network in accordance with an embodiment of the present invention.

FIG. 12 shows the resulting geolocation polygon 1212 for Network E 1202 using the extreme prediction algorithm described in FIG. 11. More specifically, point 1 1204, point 2 1206, point 3 1208, and point 4 1210 create the polygon 1212 (dashed line) that defines the geolocation prediction for Network E according to the weighted average prediction described in FIG. 9.

In another embodiment of the present invention, the accuracy of the foregoing geolocation predictions may be tested, and geolocation may be determined, by comparing a weighted average prediction to an extreme prediction. If a ratio of the two is too high (e.g., higher than a predetermined threshold or maximum allowed ratio), the weighted prediction geolocation information may be rejected. If the ratio is acceptable (i.e., less than or equal to the threshold), the weighted average prediction may be used as a determination of geolocation information for the Unseen Network. In an embodiment, the area of each prediction (A) (weighted average ($A_w$) and extreme ($A_e$)) is calculated, where the area of prediction (A) is a function of the latitude and longitude coordinates that is transformed to account for the curvature of the earth. So A=Fn(Lat, Long, Lat1, Long2)*, where * is an approximate geometric transform to account for the earth's curvature. The ratio is calculated as:

$$\text{Ratio} = \frac{A_e}{A_w}$$

If the ratio exceeds a maximum number, for example 4, then the extreme weighted prediction is rejected. If the ratio is less than the maximum number, the weighted average prediction may be used as a final determination of geolocation. In another embodiment, the lower the ratio the higher the confidence may be in the weighted average prediction.

As illustrated, system 1300 may include one or more client computing devices 1306 and 1308 (e.g., client computing devices 102, 122, and 132 from FIG. 1) that run applications and may send requests over a network as described herein. In some examples, the client applications may execute locally on a client computing device. In other examples, client applications (e.g., a mobile app on a thin client computing device 1304, 1306) may operate in communication (e.g., via network 1310) with a corresponding server version of an application executing on one or more server computing devices, e.g., server computing device 1308. In still other aspects, rather than executing a client version of an application, the one or more client computing devices may remotely access, e.g., via a browser over network 106, the application implemented on the server computing device 1308 or multiple server computing devices (e.g., in a distributed computing environment such as a cloud-computing environment).

Figure 13:
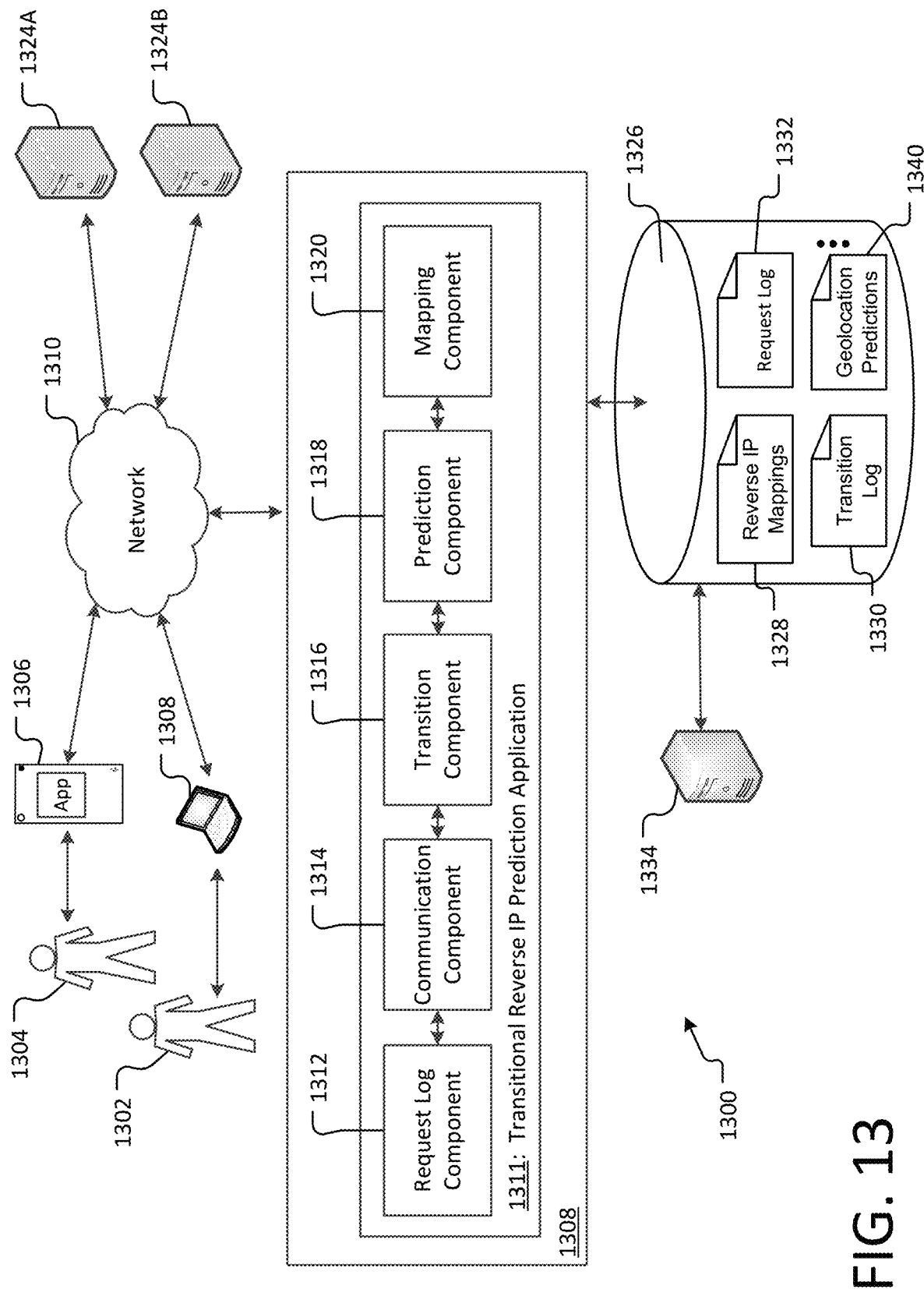
FIG. 13 illustrates a networked-computing environment and server computer for determining geolocation of an IP address.

As illustrated by FIG. 13, a transitional reverse IP prediction application 1311 is implemented by server computing device 1308. As should be appreciated, the server version of transitional reverse IP prediction application 1311 may also be implemented in a distributed environment (e.g., cloud-computing environment) across a plurality of server computing devices (not shown). Moreover, as should be appreciated, either a client or a server version of the transitional reverse IP prediction application 1311 may be capable of determining geolocation of an Unseen Network. While a server version of the transitional reverse IP prediction application 1311 and associated components 1312-1320 are shown and described, this should not be understood as limiting. Rather, a client version of transitional reverse IP prediction application 1310 may similarly implement components 1312-1320 on a client computing device 1302, 1304.

In a basic configuration, the one or more client computing devices 1302 and 1304 are personal or handheld computers having both input elements and output elements operated by one or more users 1302, 1304. For example, the one or more client computing devices 1306, 1308 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client transitional reverse IP prediction application and/or remotely accessing transitional reverse IP prediction application 1311 may be utilized.

In some aspects, network 1306 is a computer network such as the Internet. In this regard, the network 1306 may include a Local Area Network (LAN), a Wide Area Network (WAN), the Internet, wireless and wired transmission mediums. In further aspects, server computing device 1308 may communicate with some components of the system via a local network (e.g., an enterprise intranet), whereas server computing device 1308 may communicate with other components of the system via a wide area network (e.g., the Internet). In addition, the aspects and functionalities described herein may operate over distributed systems (e.g., cloud-computing systems), where application functionality, memory, data storage and retrieval, and various processing functions may be operated remotely from each other over a distributed computing network, such as the Internet or an intranet.

As described above, the transitional reverse IP prediction application 1311 may be implemented on a server computing device 1308. In a basic configuration, server computing device 1308 may include at least a processing unit and a system memory for executing computer-readable instructions. In some aspects, server computing device 1308 may comprise one or more server computing devices 1308 in a distributed environment (e.g., cloud-computing environment). Server computing device 1308 may create transitional reverse IP mapping objects for sharing between the one or more client computing devices 1304 and/or one or more other server computing devices (e.g., server computing devices 1324A and/or 1324B) via network 1310.

As illustrated in FIG. 13, the transitional reverse IP prediction application 1311 may include various components for determining geolocation for an Unseen Network, including request log component 1312, a communication component 1314, a transition component 1316, a prediction component 1318, a mapping component 1320, and the like. In aspects, each component may communicate and pass data between the other components. The various components may be implemented using hardware, software, or a combination of hardware and software. Moreover, the various components may be executed on a single server computing device (e.g., server computing device 1308), on multiple server computing devices (e.g., server computing devices 1324A, 1324B and/or 1334), or locally on a client computing device (e.g., client computing device 1304, 1306).

The transitional reverse IP prediction application 1310 may be configured to determine geolocation for an Unseen Network using the methods described above.

Communication component 1314 may receive one or more requests from client devices 1304, 1306. In aspects, communication component 1314 may receive requests from client devices, such as search requests 312, 322, 334, 348, and 364 from client 102 shown in FIG. 3. In an embodiment, communication component 1314 may detect that a request has information related to mapping Networks based on analyzing information contained in the requests. For example, the communication component 1314 may recognize that a request contains a client identifier, an IP Address, and a time stamp. Communication component 1314 may parse requests to retrieve the client identifier, the IP address, and the time stamp and forward this information to the request log component 1312. As should be appreciated, communication component 1314 may receive one or more requests by any suitable means. The above examples are provided for purposes of explanation should not be considered to be limiting.

In embodiments of the present invention, the request log component 1312 gathers and stores information useful in learning user transitions over time as particular users move between a Known Network and an Unseen Network as described in connection with FIGS. 3-5 above. The request log component 1312 may receive information from a request as detailed above, including an identifier for the user or client device or application making the request, the IP address used to send the request, and a time stamp marking the time when the request is sent. Request log component 1312 uses this information to create request logs, such as request log 500 shown in FIG. 5. However, as detailed above, a request log may be in any format that includes this type of information. Request log component 1312 may store a request logs, such as request log 1332, for a given period of time in data storage 1326.

Transition component 1316 identifies User Transitions for particular users from a Known Network to an Unseen Network, or vice versa, as detailed in FIGS. 5-8 above. More specifically, transition component 1316 retrieves requests logs, such as request log 1332 from storage 1326, and transforms the information in a request log into a transition log 1330 in data storage 1326. In aspects, transition component 1316 may aggregate requests for a particular user, sort requests for particular users by time, identify consecutive pairs of requests, retrieve information from the reverse IP mappings 1328 to determine whether or not a particular Network in a request is Known or Unseen, and add a User Transition to a transition log, such as transition log 800 and 1330.

Prediction component 1318 predicts geolocation of Unseen Networks using both the User Transitions (e.g. transition log 1330 from transition component 1316 and geolocation information for the Known Networks, such as reverse IP mappings 1328) in accordance with embodiments of the present invention described in connection with FIGS. 9-12 above.

In aspects, prediction component 1318 uses the weighted average algorithm to predict geolocation for an Unseen Network as described in connection with FIGS. 9 and 10. For example, prediction component 1318 uses a transition log to determine which Known Networks have a User Transition to an Unseen Network and further determines how many Users Transitions there between that Known Network and the Unseen Network. The prediction component 1318 may weight the geolocation information for each Known Network by the count of the transitions with the Unseen Network. The prediction component 1318 then averages the weighted geolocation information for each contributing Known Network to create a weighted average geolocation prediction for the Unseen Network.

In other aspects of the invention, prediction component 1318 uses the extreme prediction algorithm, either alone or in combination with the weighted average prediction algorithm, to determine geolocation for an Unseen Network as described in connection with FIGS. 11 and 12. The prediction component 1318 may access the geographic coordinates for each contributing Known Network from the reverse IP mappings 1328 and compares the coordinates to find the extreme coordinates for all of these Known Networks. For example, the prediction component 1318 may identify the smallest and largest latitude coordinates and the smallest and largest longitude coordinates to create a geolocation polygon comprising an extreme geolocation prediction for the Unseen Network. In an embodiment, the prediction component 1318 stores its geolocation predictions 1340 in data store 1326.

Mapping component 1320 determines whether geolocation predictions from the prediction component 1318 are accurate as described above. In aspects, when the mapping component determines that a prediction is accurate, it stores the geolocation information for that Unseen Network as a reverse IP mapping 1328 and changes the status of that Network from Unseen to Known.

As should be appreciated, the various devices, components, etc., described with respect to FIG. 13 are not intended to limit the systems and methods to the particular components described. Accordingly, additional topology configurations may be used to practice the methods and systems herein and/or some components described may be excluded without departing from the methods and systems disclosed herein.

Figure 14:
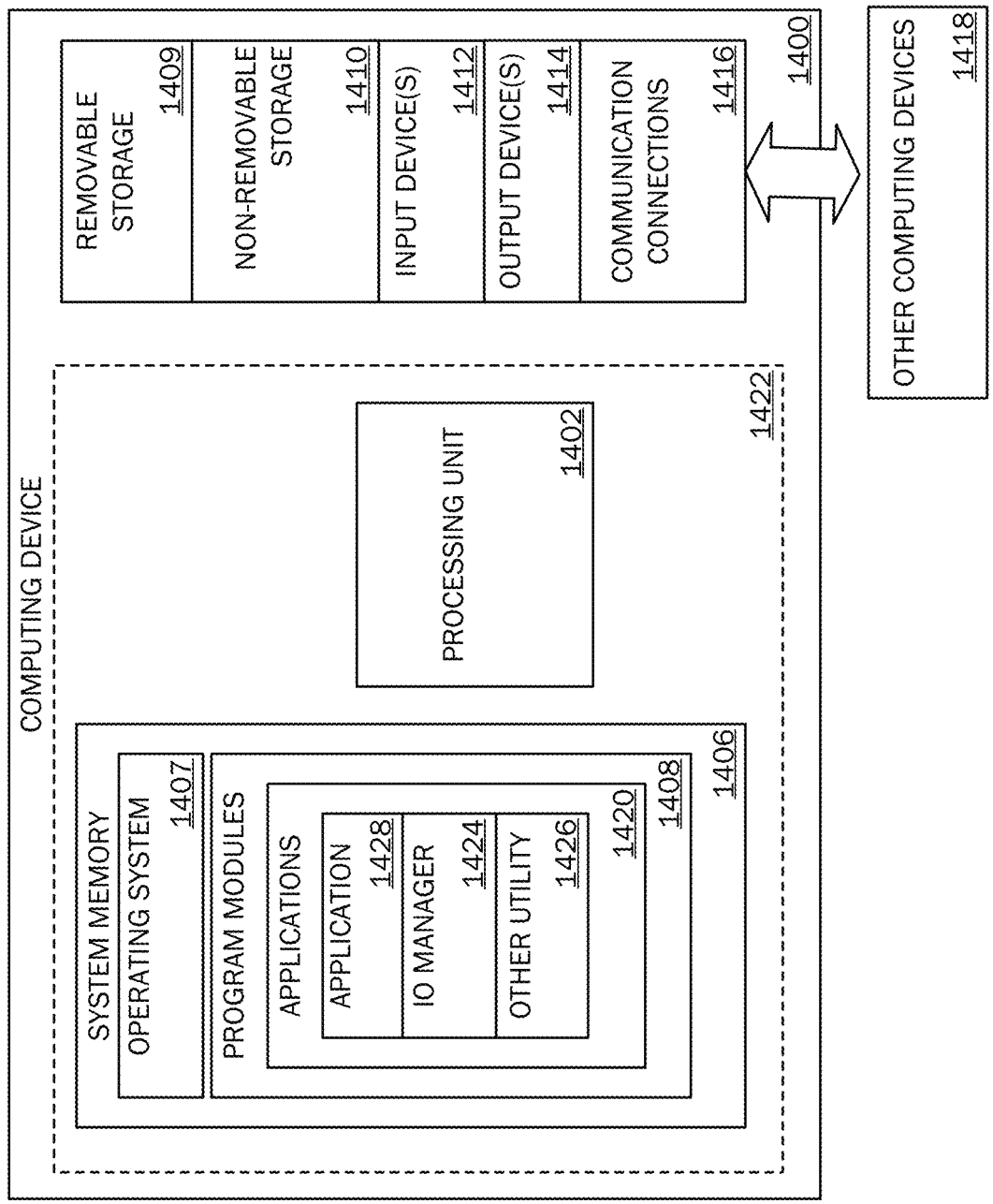
FIG. 14 illustrates an exemplary tablet computing device that may execute one or more aspects disclosed herein.
Figure 15A:
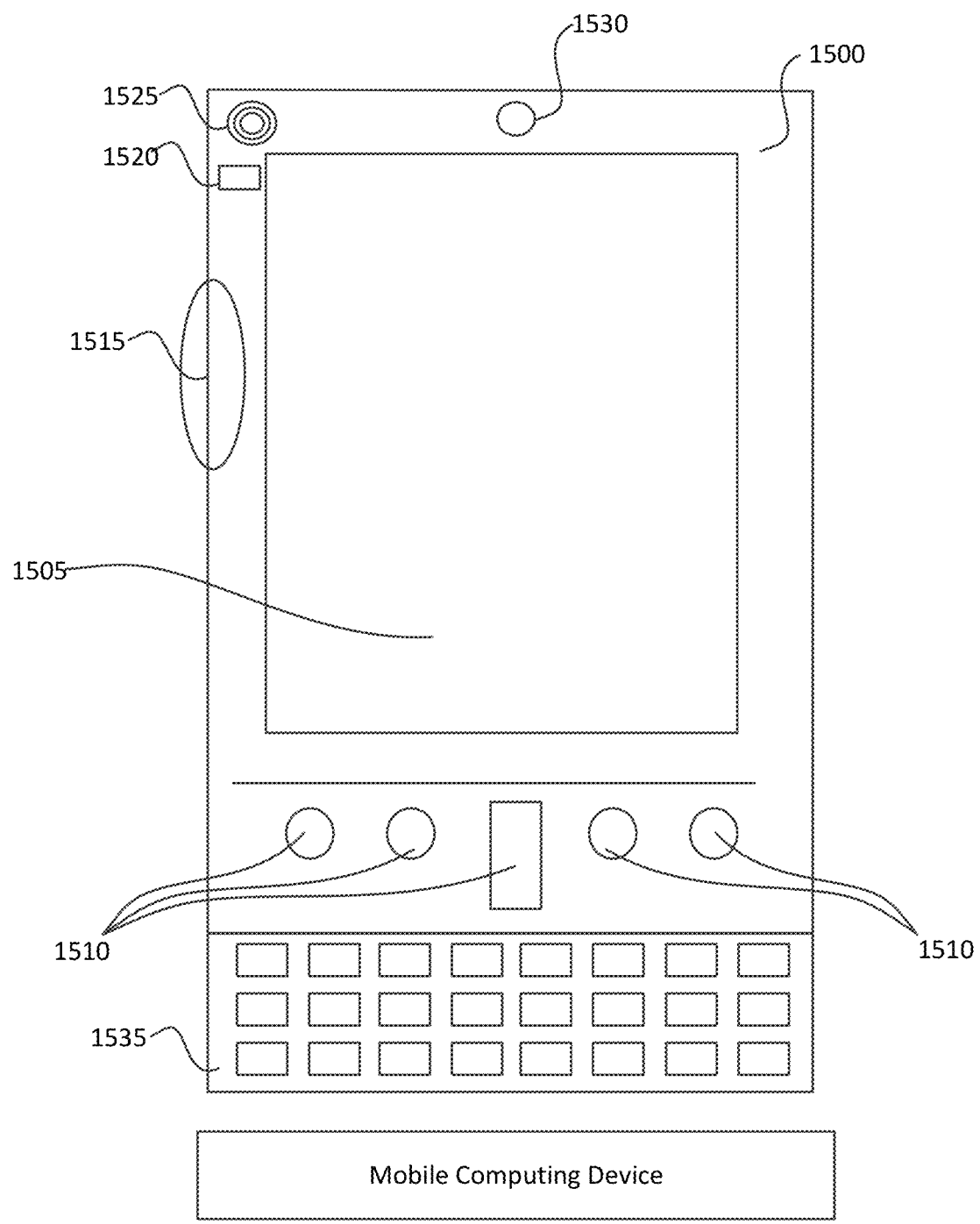
FIGS. 15A and 15B illustrate a mobile computing device, for example, a mobile telephone, a smart phone, a personal data assistant, a tablet personal computer, a laptop computer, and the like, with which examples of the invention may be practiced.
Figure 15B:
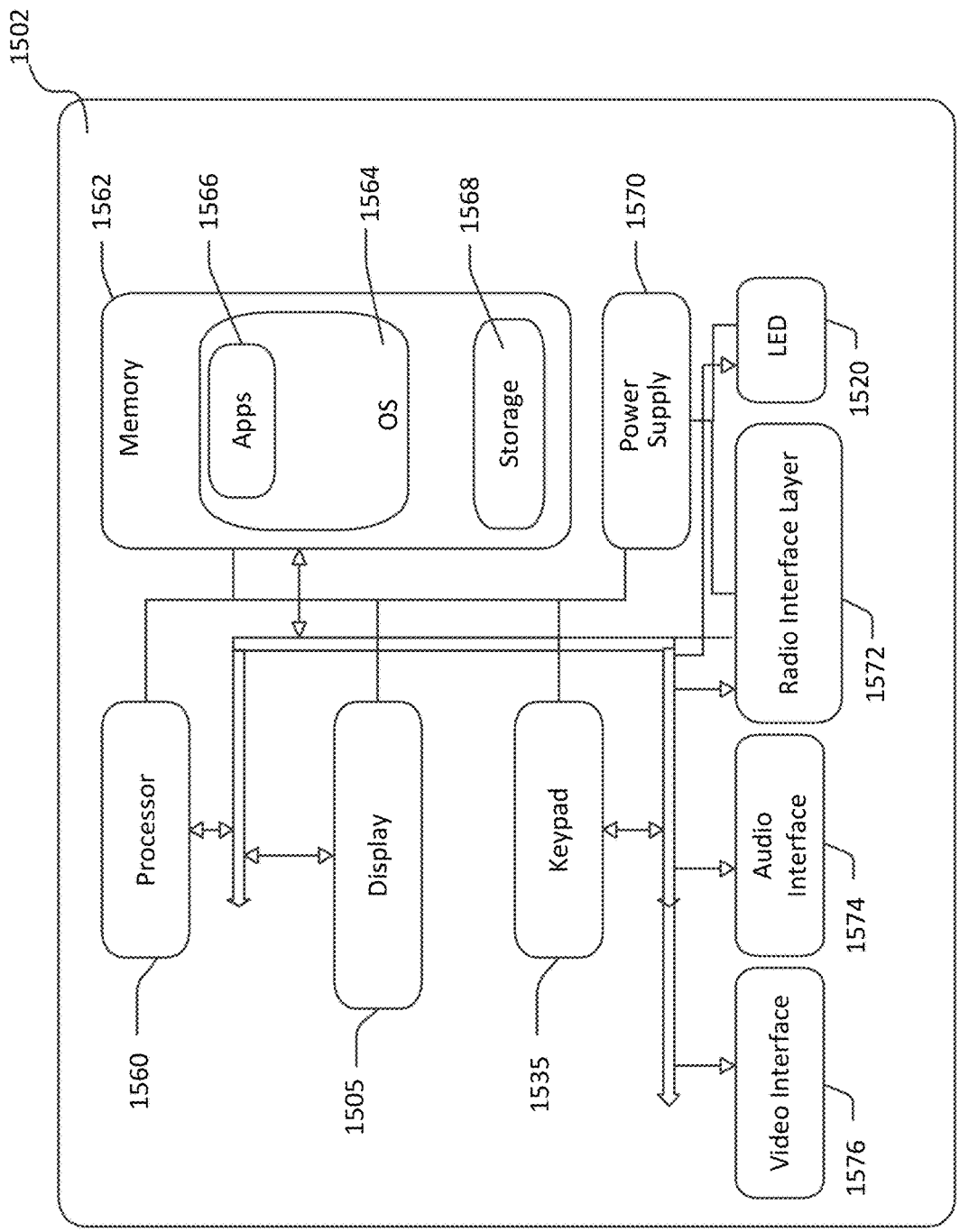
Figure 16:
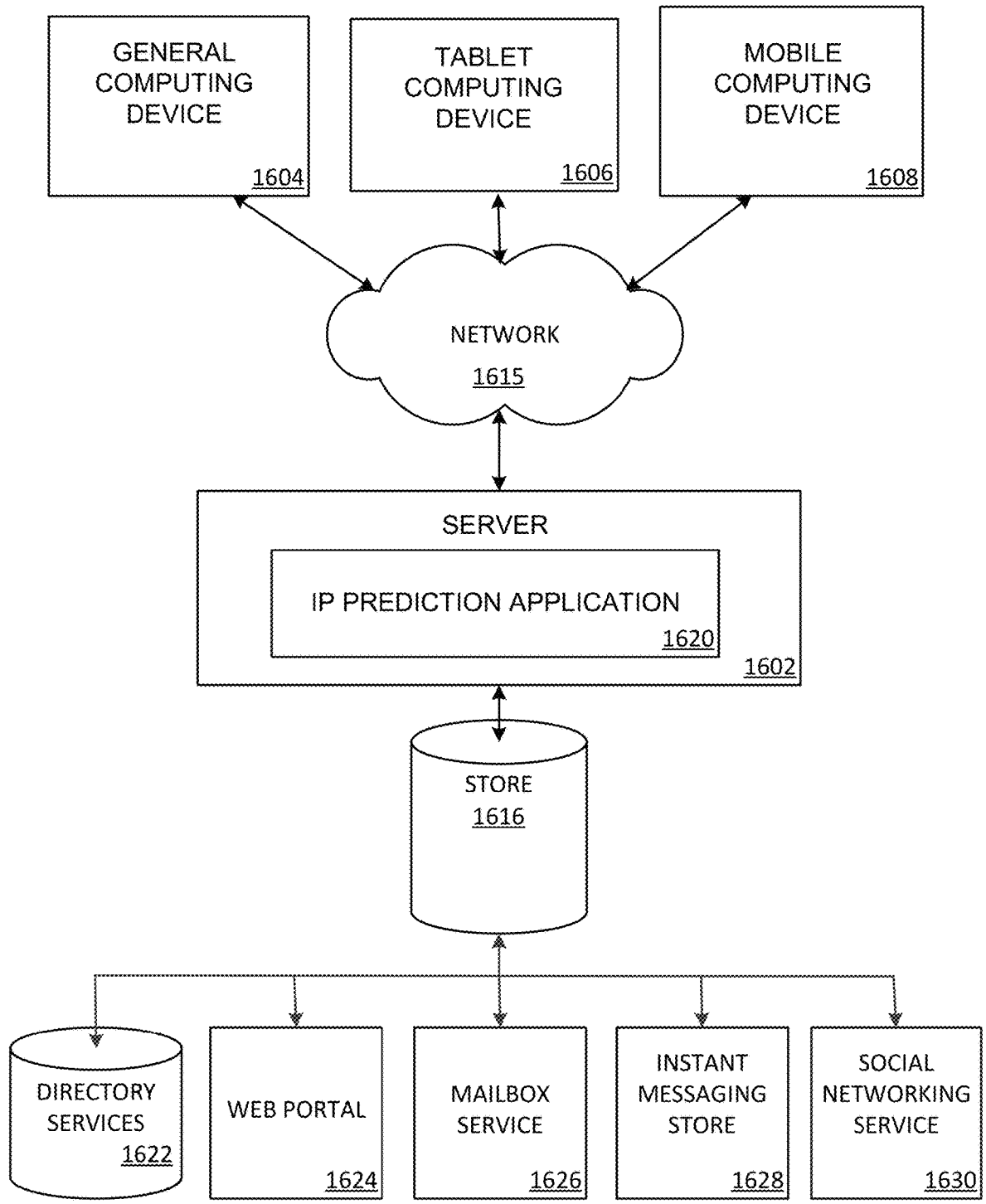
FIG. 16 is a simplified block diagram of a distributed computing system in which aspects of the present disclosure may be practiced.

FIGS. 14-16 and the associated descriptions provide a discussion of a variety of operating environments in which aspects of the disclosure may be practiced. However, the devices and systems illustrated and discussed with respect to FIGS. 14-16 are for purposes of example and illustration and are not limiting of a vast number of computing device configurations that may be utilized for practicing aspects of the disclosure, as described herein.

FIG. 14 is a block diagram illustrating physical components (e.g., hardware) of a computing device 1400 with which aspects of the disclosure may be practiced. The computing device components described below may have computer executable instructions for mapping an Unseen Network on a computing device (e.g., web server 150, server 152 and/or clients 102, 122, and 132) that can be executed to implement the methods disclosed herein. In a basic configuration, the computing device 1400 may include at least one processing unit 1402 and a system memory 1406. Depending on the configuration and type of computing device, the system memory 1406 may comprise, but is not limited to, volatile storage (e.g., random access memory), non-volatile storage (e.g., read-only memory), flash memory, or any combination of such memories. The system memory 1406 may include an operating system 1407 and one or more program modules 1408 suitable for applications 1420, such as application 1428 (e.g., browser application), and IO manager 1424, and other utilities 1426, in particular, transitional reverse IP prediction application.

The operating system 1407, for example, may be suitable for controlling the operation of the computing device 1400. Furthermore, embodiments of the disclosure may be practiced in conjunction with a graphics library, other operating systems, or any other application program and is not limited to any particular application or system. This basic configuration is illustrated in FIG. 14 by those components within a dashed line 1422. The computing device 1400 may have additional features or functionality. For example, the computing device 1400 may also include additional data storage devices (removable and/or non-removable) such as, for example, magnetic disks, optical disks, or tape. Such additional storage is illustrated in FIG. 14 by a removable storage device 1409 and a non-removable storage device 1410.

As stated above, a number of program modules and data files may be stored in the system memory 1406. While executing on the processing unit 1402, the program modules 1406 (e.g., transitional reverse IP prediction application 1311) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 14 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1400 may also have one or more input device(s) 1412 such as a keyboard, a mouse, a pen, a sound or voice input device, a touch or swipe input device, etc. The output device(s) 1414 such as a display, speakers, a printer, etc. may also be included. The aforementioned devices are examples and others may be used. The computing device 1400 may include one or more communication connections 1416 allowing communications with other computing devices 1418. Examples of suitable communication connections 1416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1406, the removable storage device 1409, and the non-removable storage device 1410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1400. Any such computer storage media may be part of the computing device 1400. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 15A and 15B illustrate a mobile computing device 1500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 15A, one aspect of a mobile computing device 1500 for implementing the aspects is illustrated. In a basic configuration, the mobile computing device 1500 is a handheld computer having both input elements and output elements. The mobile computing device 1500 typically includes a display 1505 and one or more input buttons 1510 that allow the user to enter information into the mobile computing device 1500. The display 1505 of the mobile computing device 1500 may also function as an input device (e.g., a touch screen display). If included, an optional side input element 1515 allows further user input. The side input element 1515 may be a rotary switch, a button, or any other type of manual input element. In alternative aspects, mobile computing device 1500 may incorporate more or less input elements. For example, the display 1505 may not be a touch screen in some embodiments. In yet another alternative embodiment, the mobile computing device 1500 is a portable phone system, such as a cellular phone. The mobile computing device 1500 may also include an optional keypad 1535. Optional keypad 1535 may be a physical keypad or a "soft" keypad generated on the touch screen display. In various embodiments, the output elements include the display 1505 for showing a graphical user interface (GUI), a visual indicator 1520 (e.g., a light emitting diode), and/or an audio transducer 1525 (e.g., a speaker). In some aspects, the mobile computing device 1500 incorporates a vibration transducer for providing the user with tactile feedback. In yet another aspect, the mobile computing device 1500 incorporates input and/or output ports, such as an audio input (e.g., a microphone jack), an audio output (e.g., a headphone jack), and a video output (e.g., a HDMI port) for sending signals to or receiving signals from an external device.

FIG. 15B is a block diagram illustrating the architecture of one aspect of a mobile computing device. That is, the mobile computing device 1500 can incorporate a system (e.g., an architecture) 1502 to implement some aspects. In one embodiment, the system 1502 is implemented as a "smart phone" capable of running one or more applications (e.g., browser, e-mail, calendaring, contact managers, messaging clients, games, and media clients/players). In some aspects, the system 1502 is integrated as a computing device, such as an integrated personal digital assistant (PDA) and wireless phone.

One or more application programs 1566 may be loaded into the memory 1562 and run on or in association with the operating system 1564. Examples of the application programs include phone dialer programs, e-mail programs, personal information management (PIM) programs, word processing programs, spreadsheet programs, Internet browser programs, messaging programs, and so forth. The system 1502 also includes a non-volatile storage area 1568 within the memory 1562. The non-volatile storage area 1568 may be used to store persistent information that should not be lost if the system 1502 is powered down. The application programs 1566 may use and store information in the non-volatile storage area 1568, such as email or other messages used by an email application, and the like. A synchronization application (not shown) also resides on the system 1502 and is programmed to interact with a corresponding synchronization application resident on a host computer to keep the information stored in the non-volatile storage area 1568 synchronized with corresponding information stored at the host computer. As should be appreciated, other applications may be loaded into the memory 1562 and run on the mobile computing device 1500, including the instructions for creating and sharing collaborative objects as described herein (e.g., request log component, communication component, transition component, collaborative object component, permissions component, and/or UX component, etc.).

The system 1502 has a power supply 1570, which may be implemented as one or more batteries. The power supply 1570 may further include an external power source, such as an AC adapter or a powered docking cradle that supplements or recharges the batteries. The system 1502 may also include a radio interface layer 1572 that performs the function of transmitting and receiving radio frequency communications. The radio interface layer 1572 facilitates wireless connectivity between the system 1502 and the "outside world," via a communications carrier or service provider. Transmissions to and from the radio interface layer 1572 are conducted under control of the operating system 1564. In other words, communications received by the radio interface layer 1572 may be disseminated to the application programs 1566 via the operating system 1564, and vice versa.

The visual indicator 1520 may be used to provide visual notifications, and/or an audio interface 1574 may be used for producing audible notifications via an audio transducer 1525 (e.g., audio transducer 1525 illustrated in FIG. 15A). In the illustrated embodiment, the visual indicator 1520 is a light emitting diode (LED) and the audio transducer 1525 may be a speaker. These devices may be directly coupled to the power supply 1570 so that when activated, they remain on for a duration dictated by the notification mechanism even though the processor 1560 and other components might shut down for conserving battery power. The LED may be programmed to remain on indefinitely until the user takes action to indicate the powered-on status of the device. The audio interface 1574 is used to provide audible signals to and receive audible signals from the user. For example, in addition to being coupled to the audio transducer 1525, the audio interface 1574 may also be coupled to a microphone to receive audible input, such as to facilitate a telephone conversation. In accordance with embodiments of the present disclosure, the microphone may also serve as an audio sensor to facilitate control of notifications, as will be described below. The system 1502 may further include a video interface 1576 that enables an operation of peripheral device 1530 (e.g., on-board camera) to record still images, video stream, and the like.

A mobile computing device 1500 implementing the system 1502 may have additional features or functionality. For example, the mobile computing device 1500 may also include additional data storage devices (removable and/or non-removable) such as, magnetic disks, optical disks, or tape. Such additional storage is illustrated in FIG. 15B by the non-volatile storage area 1568.

Data/information generated or captured by the mobile computing device 1500 and stored via the system 1502 may be stored locally on the mobile computing device 1500, as described above, or the data may be stored on any number of storage media that may be accessed by the device via the radio interface layer 1572 or via a wired connection between the mobile computing device 1500 and a separate computing device associated with the mobile computing device 1500, for example, a server computer in a distributed computing network, such as the Internet. As should be appreciated such data/information may be accessed via the mobile computing device 1500 via the radio interface layer 1572 or via a distributed computing network. Similarly, such data/information may be readily transferred between computing devices for storage and use according to well-known data/information transfer and storage means, including electronic mail and collaborative data/information sharing systems.

As should be appreciated, FIGS. 15A and 15B are described for purposes of illustrating the present methods and systems and are not intended to limit the disclosure to a particular sequence of steps or a particular combination of hardware or software components.

FIG. 16 illustrates one aspect of the architecture of a system for processing data received at a computing system from a remote source, such as a general computing device 1604 (e.g., personal computer), tablet computing device 1606, or mobile computing device 1608, as described above. Content displayed at server device 1602 may be stored in different communication channels or other storage types.

For example, various documents may be stored using a directory service 1622, a web portal 1624, a mailbox service 1626, an instant messaging store 1628, or a social networking service 1630. The transitional reverse IP prediction application 1621 may be employed by a client that communicates with server device 1602, and/or the transitional reverse IP prediction application 1620 may be employed by server device 1602. The server device 1602 may provide data to and from a client computing device such as a general computing device 1604, a tablet computing device 1606 and/or a mobile computing device 1608 (e.g., a smart phone) through a network 1615. By way of example, the computer system described above with respect to FIGS. 1-11 may be embodied in a general computing device 1604 (e.g., personal computer), a tablet computing device 1606 and/or a mobile computing device 1608 (e.g., a smart phone). Any of these embodiments of the computing devices may obtain content from the store 1616, in addition to receiving graphical data useable to either be pre-processed at a graphic-originating system or post-processed at a receiving computing system.

As should be appreciated, FIG. 16 is described for purposes of illustrating the present methods and systems and is not intended to limit the disclosure to a particular sequence of steps or a particular combination of hardware or software components.

In a first aspect, a system is provided. The system includes a processing unit and a memory storing computer executable instructions that, when executed by the processing unit, cause the system to perform actions. For instance, in response to the computer executable instructions, the system receives a task list for a project, where the task list includes a plurality of tasks, and creates a collaborative object including the task list. Additionally, the system associates a task to a document and receives an update to the document to complete the task. In response to receiving the update to the document, the system updates the task list to reflect completion of the task and provides a control for performing an action upon completion of the task list.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While example examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed:

1. A computerized system for determining the geolocation of an unseen IP address, wherein the system comprises:
a processor; and
memory storing computerized instructions that when executed by the processor cause the processor to:
receive at least one request from at least one client computer;
identify at least one user transition, wherein the at least one user transition comprises a first request from at least one known IP address and a second request from the unseen IP address, wherein the geolocation information is known for the at least one known IP address; and
determine geolocation information for the unseen IP address based on the at least one user transition and the geolocation information for the at least one known IP address.

2. The computerized system of claim 1, wherein the at least one request comprises a client ID, an IP address, and a time-stamp.

3. The computerized system of claim 1, further comprising computerized instructions stored in the memory that when executed by the processor cause the processor to:
determine a weighted average geolocation prediction for the unseen IP address.

4. The computerized system of claim 3, wherein the weighted average geolocation prediction is weighted based on a count of transitions from the at least one known IP address to the unseen IP address.

5. The computerized system of claim 1, further comprising computerized instructions stored in the memory that when executed by the processor cause the processor to:
determine an extreme geolocation prediction for the unseen IP address, wherein the extreme geolocation prediction is comprised of at least one pair of geographic coordinates associated with the at least one known IP address.

6. A computerized method for determining a geolocation of an unseen network comprising:

identifying at least one user transition, wherein the at least one user transition is between at least one known network and the unseen network;

based on the identification of the at least one user transition, gathering geolocation information for the at least one known network; and predicting the geolocation of the unseen network based on the at least one user transition and the geolocation information for the at least one known network.

7. The computerized method of claim 6, further comprising:

determining a count of user transitions between the at least one known network and the unseen network.

8. The computerized method of claim 7, wherein predicting the geolocation of the unseen network further comprises determining a weighted average geolocation prediction.

9. The computerized method of claim 8, wherein determining a weighted average geolocation prediction comprises:

weighting the geolocation information for a first known network by the count of user transitions between the first known network and the unseen network to create weighted geolocation information for the first known network;

weighting the geolocation information for a second known network by the count of user transitions between the second known network and the unseen network to create weighted geolocation information for the second known network; and averaging the weighted geolocation information for the first known network and the weighted geolocation information for the second known network.

10. The computerized method of claim 9, wherein predicting the geolocation of the unseen network further comprises determining an extreme geolocation prediction.

11. The computerized method of claim 10, wherein predicting the geolocation of the unseen network further comprises:

calculating a ratio by comparing the weighted average geolocation prediction to the extreme geolocation prediction; and comparing the ratio to a threshold.

12. The computerized method of claim 10, wherein predicting the geolocation of the unseen network accounts for the curvature of the earth.

13. The computerized method of claim 6, wherein predicting the geolocation of the unseen network further comprises determining an extreme geolocation prediction by identifying at least four extreme coordinates from a set of coordinates.

14. The computerized method of claim 13, wherein the at least four extreme coordinates comprise:

a first latitude and a first longitude, wherein the first latitude is the largest value in the set of coordinates and the first longitude is the smallest longitude in the set of coordinates;

a second latitude and a second longitude, wherein the second latitude is the smallest value in the set of coordinates and the second longitude is the largest longitude in the set of coordinates;

the first latitude and the second longitude; and the second latitude and the first longitude.

15. The computerized method of claim 14 further comprising:

creating a polygon based on the at least four extreme coordinates, wherein the polygon identifies the geolocation of the unseen network.

16. The computerized method of claim 6, wherein the unseen network is at least one of: an IPv4 address and an IPv6 address.

17. The computerized method of claim 6, wherein the at least one user transition comprises a pair of consecutive requests, wherein one request of the pair of consecutive requests is from the at least one known network and the other request from the pair of consecutive requests is from the unseen network.

18. The computerized method of claim 17, wherein the pair of consecutive requests are from a same client computer.

19. A computerized method for mapping an unseen network comprising:

creating a request log comprising a plurality of requests, wherein each request comprises a client ID, a network address, and a time stamp;

transforming the request log into a transition log, wherein the transition log comprises a plurality of user transitions from at least one known network to the unseen network; and determining geolocation information for the unseen network based on the transition log.

20. The computerized method of claim 19, wherein transforming the request log into the transition log further comprises:

retrieving the request log;

aggregating the plurality of requests according to the client ID;

removing duplicates from the request log;

sorting the plurality of requests according to the timestamp; and logging a plurality of pairs of consecutive requests, wherein the pairs of consecutive requests comprise one request from the at least one known network and another request from the unseen network.

* * * * *